United States Patent
Ryan

(10) Patent No.: US 6,682,118 B2
(45) Date of Patent: *Jan. 27, 2004

(54) VEHICLE CARGO COMPARTMENT LINER

(75) Inventor: Patrick T. Ryan, Halifax (CA)

(73) Assignee: Neocon International Inc., Dartmouth (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,071

(22) Filed: Oct. 13, 1999

(65) Prior Publication Data

US 2002/0000733 A1 Jan. 3, 2002

Related U.S. Application Data

(60) Provisional application No. 60/103,914, filed on Oct. 13, 1998.

(51) Int. Cl.[7] .............................................. B60R 13/01
(52) U.S. Cl. ................................. 296/39.1; 296/37.16
(58) Field of Search ........................... 296/39.1, 37.16, 296/37.5, 37.1, 39.2

(56) References Cited

U.S. PATENT DOCUMENTS

| | | | |
|---|---|---|---|
| 4,305,695 A | | 12/1981 | Zachrich |
| 4,718,584 A | | 1/1988 | Schoeny |
| 4,807,760 A | | 2/1989 | Sussman |
| 4,944,544 A | | 7/1990 | Dick |
| 4,991,899 A | * | 2/1991 | Scott .......................... 296/39.2 |
| 5,025,964 A | | 6/1991 | Phirippidis |
| 5,054,668 A | * | 10/1991 | Ricchiuti ................. 224/42.42 |
| 5,083,827 A | | 1/1992 | Hollenbaugh, Sr. |
| 5,154,478 A | * | 10/1992 | Erickson et al. ........... 296/39.2 |
| 5,167,433 A | * | 12/1992 | Ryan ........................ 296/37.1 |
| 5,205,602 A | * | 4/1993 | Hoare et al. ................ 296/39.1 |
| D341,252 S | | 11/1993 | Ryan |
| D344,481 S | | 2/1994 | Ryan |
| D345,050 S | | 3/1994 | Ryan |
| 5,419,602 A | | 5/1995 | VanHoose |
| 5,685,592 A | * | 11/1997 | Heinz ....................... 296/37.16 |

OTHER PUBLICATIONS

Trunk Guard™ Universal Series folder, printed Jan. 1994, NEOCON International.
Trunk Guard™ Exclusive Series folder, printed Jan. 1994, NEOCON International.
Pro–liner price list and related material, effective Oct. 15,1991.
Plastics News, Nov. 4, 1991, p. 13, "PRO–form cleaning up with automotive liner".
The Kargo Keeper Tray folder, PENDA Accessories, printed Jan. 1991, Penda Corporation.
The Kargo Bay Tray flyer, PENDA Accessories, printed Jan. 1991, Penda Corporation.

* cited by examiner

*Primary Examiner*—Joseph D. Pape
(74) *Attorney, Agent, or Firm*—R. Craig Armstrong; Borden Ladner Gervais LLP

(57) ABSTRACT

An organizer liner is provided for use in a vehicle cargo compartment. The liner has a flexible bottom preferably conforming generally to the shape of the cargo compartment floor, and one or more of rear, side and front rigid elements, preferably at least some of which generally conform to walls of the cargo compartment. The rigid elements preferably include storage means such as cup holders, trays, bins, insulated coolers, soda or water/milk jug holders, storage boxes with or without lids, or storage wells. Optional partition dividers may be provided. The dividers may include at least one long reinforced divider between opposite walls of the liner, and optionally at least one short divider between the long divider and a wall of the liner, or between two long dividers.

8 Claims, 25 Drawing Sheets

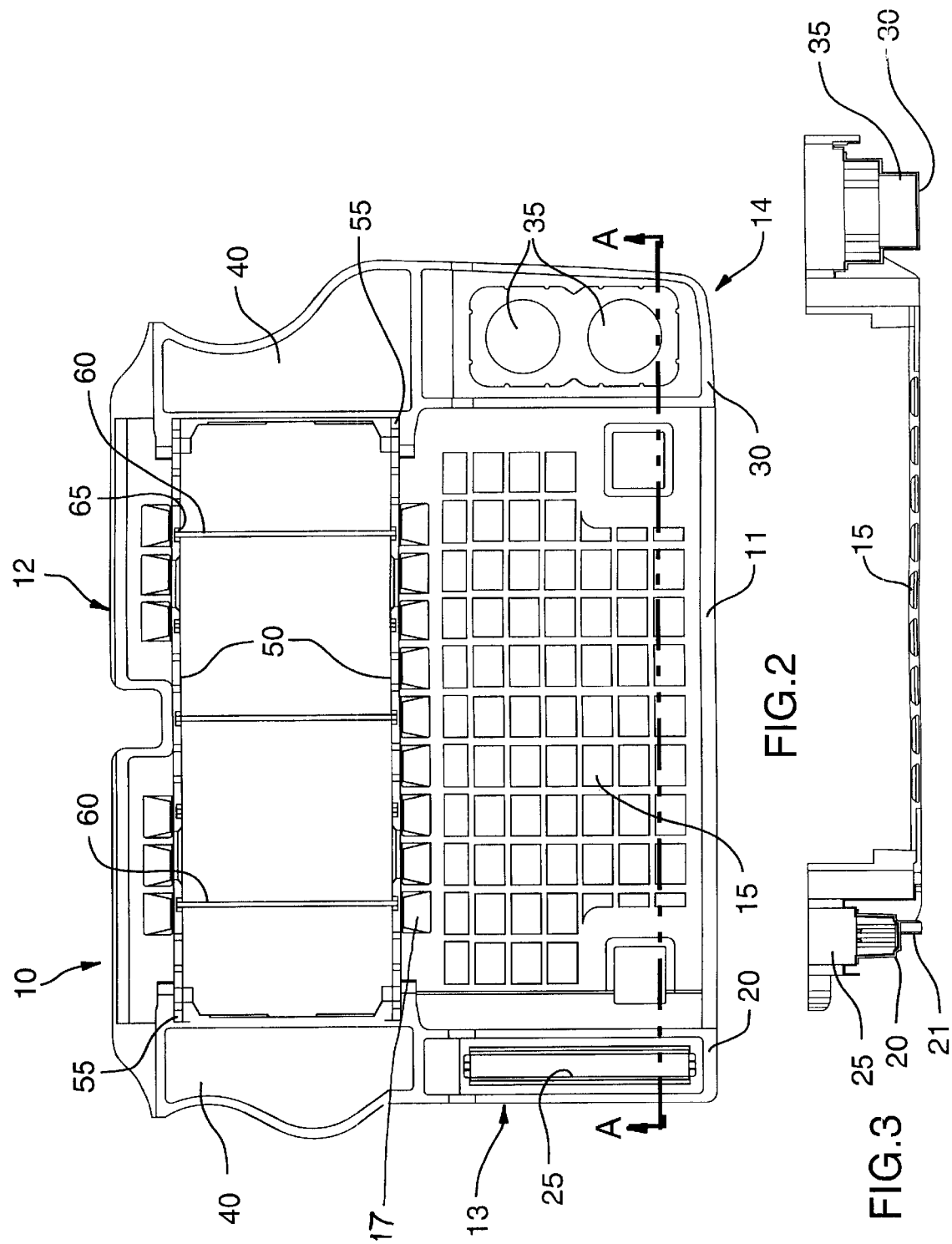

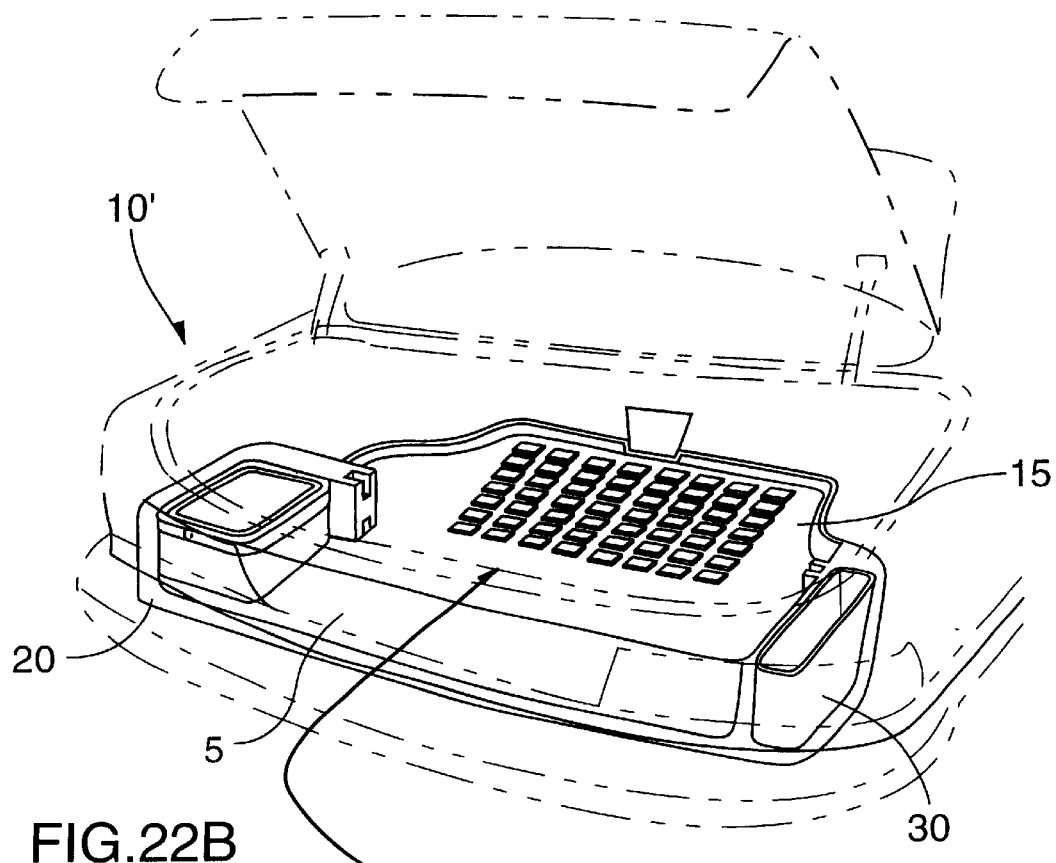
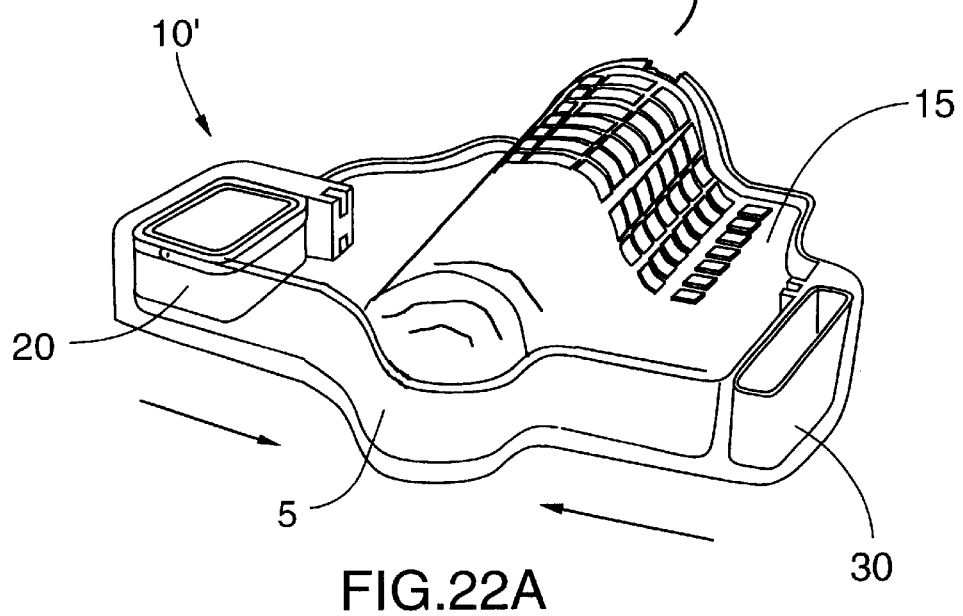
FIG.22B
FIG.22A

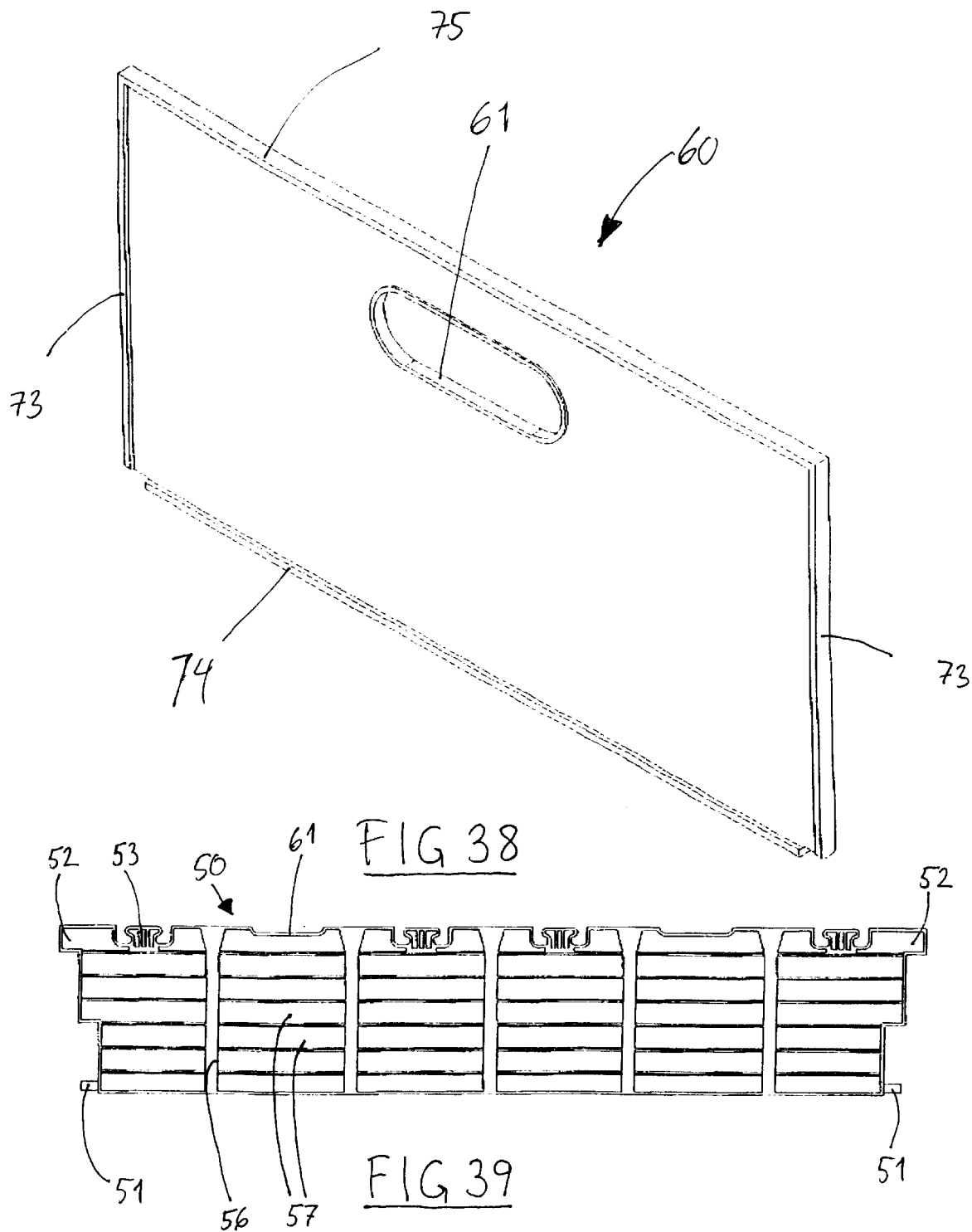

VEHICLE CARGO COMPARTMENT LINER

This application claims the benefit of provisional application No. 60/103,914 filed on Oct. 13, 1998.

BACKGROUND OF THE INVENTION

1. Field of the Invention

The present invention relates to a vehicle organizer system, for the cargo compartment of a vehicle.

Throughout this description, in the interest of consistency and certainty, "front" is with reference to the front of the vehicle, and "rear" or "back" is with reference to the rear of the vehicle. Thus, for example, the rear of an automobile trunk or of the liner is intended to mean the portion closest to the rear of the automobile.

2. Description of the Prior Art

Historically, vehicle cargo compartment areas such as automobile trunks (or "boots"), have been lacking in several respects for the user. With the ever-increasing popularity of so-called mini-vans, the cargo space has increased, but the basic drawbacks are the same.

Firstly, dirt and spills are difficult to clean up because there is often poor accessibility to the cargo compartment area, particularly in the case of automobile trunks, making cleaning efforts awkward. Corrosive and grimy substances stain and even damage the cargo compartment carpeting and flooring.

Secondly, there is a desire and need to utilize cargo compartments to carry corrosive and grimy substances and the like, but there is a reluctance to do so because of the negative results, such as dirtying, dis-colouration and damaging the cargo compartment carpet, or similar.

Thirdly, cargo compartment areas commonly have poor storage and organization capability, one problem being that heavy cargo could slide on the cargo compartment floor and damage lighter, fragile cargo, and the present invention addresses that problem as well.

To address these problems, a rigid cargo compartment liner was developed as disclosed in WO 94/12370. The liner comprises a generally trough shaped plastic liner, optionally provided with a plurality of dividers, for dividing the larger space inside the liner into several smaller areas. The one-piece construction of the trough part of the liner, i.e. the side walls and the bottom wall, provide an effective means of keeping dirt and unwanted substances inside the liner and away from the cargo area carpet. One apparent drawback with the rigid liner is that it can be difficult to install in a vehicle, especially if the cargo opening is smaller than the cargo area itself, since the liner is rigid. In this case, the liner also has to be made of an overall dimension which will fit into the cargo opening, but will leave some areas of the cargo space not covered by the liner. Thus, either the cargo space is not fully utilized, or there remains a risk that cargo placed outside the liner will dirty or damage the cargo area.

DISCLOSURE OF THE INVENTION

It is an object of the invention to provide an organizer system that may easily be incorporated into the cargo compartment of a vehicle, regardless of the shape and size of the access opening to that space. The liner is offered as a means of enabling users to broaden cargo compartment usage without fear of cargo causing damage to the cargo compartment area, and with the knowledge that virtually any resulting mess can be cleaned up in minutes.

Another object of the invention is to provide a cargo compartment vehicle organizer system that offers various benefits, including complete protection as a liner with organizational capability using a series of partitions, and overall convenience through various add-on features that are incorporated with the main embodiment of the complete product. The liner also improves storage capability by increasing the useable storage space of the cargo area of the vehicle. The system is offered as a means of providing increased overall flexibility, protection of the cargo area hold of sport utility vehicles, vans and station wagons, as well as the trunks of passenger cars. The system does not interfere with existing vehicle features, but is integral with them, such as cargo net hooks, jack access panels, air conditioning vents and sub-floor access panels. The organizer liner could also, at least in part, replace the carpet in the cargo compartment, obviating the need to install this carpet during vehicle assembly. The organizer liner also eliminates squeaks and rattles, due to its construction.

In the invention, an organizer liner is provided for use in a vehicle cargo compartment. The liner preferably has a flexible bottom conforming generally to the shape of the cargo compartment floor, and one or more of rear, side and front rigid elements, at least some of which generally conform to the shape of the walls and/or the floor of the cargo compartment. Optional partition dividers may be provided. The dividers may be ribbed or otherwise profiled for greater rigidity and strength, and may be supported by grooves in the walls of the organizer liner. The dividers include at least one long reinforced divider between opposite walls of the liner or, and optionally at least one short divider between the long divider and a wall of the liner or between two long dividers. The long divider is preferably also supported at opposite ends by grooves in the walls of the liner. The reinforcement is preferably on the side of the long divider opposite the short divider(s), and is preferably continuous along the long divider.

Preferably, each short divider has a vertical slot at one end thereof defining a hook portion adapted to hook over the long divider. The hook portion preferably extends downwardly far enough to overlie at least one of the ribs of the long divider in a friction fit.

The liner can be adapted to the cargo compartment of virtually any vehicle, including but not limited to automobile trunks, station wagon rear compartments, and van, minivan or "4×4" luggage areas.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 2 is a plan view of the organizer liner of FIG. 1;

FIG. 3 is a section along the line A–A of FIG. 2;

FIG. 22A is an elevational side view of the organizer liner in according to FIG. 22, showing the liner in a folded state with the dividers removed;

FIG. 22B is an elevational side view of the organizer liner in according to FIG. 22A, showing the liner in a spread out state;

FIG. 38 is an elevational side view of a short partition divider according to the present invention;

FIG. 39 is a side view of a long partition divider according to the present invention;

DETAILED DESCRIPTION OF THE INVENTION

Figure 1:
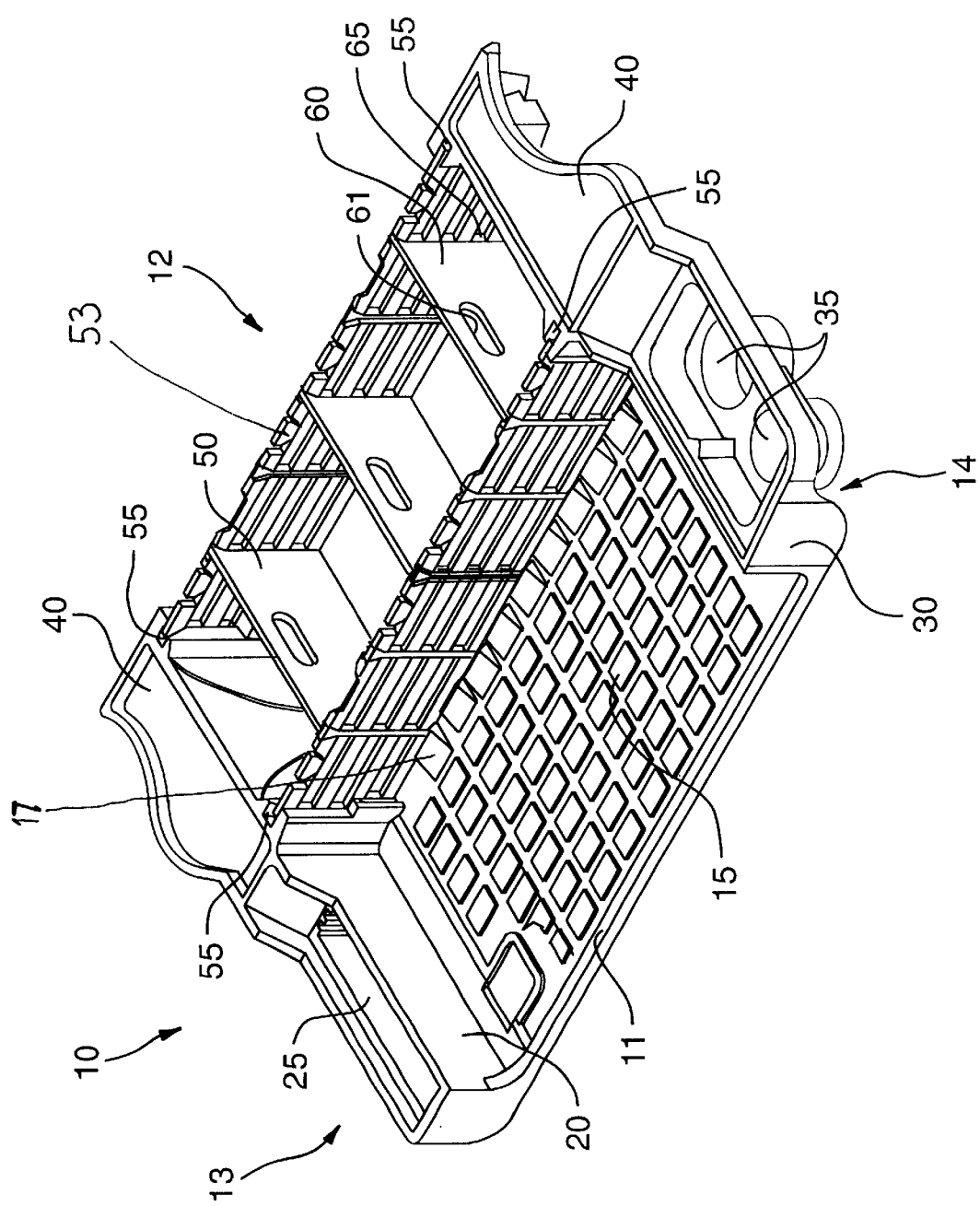
FIG. 1 is an elevational side view of a first embodiment of an organizer liner in accordance with the present invention, having rigid side elements together with short and long partition dividers.

Referring to FIGS. 1 and 2, an organizer liner 10, preferably covering a substantial part of a cargo space of a vehicle (not shown), has a rear side 11, a front side 12, a left side 13 and a right side 14, right and left being defined with respect to a forward direction of the vehicle. The liner further has a bottom portion 15, which is made of a flexible material such as flexible thermoplastics. Examples of such thermoplastics are thermoplastic elastomers (TPE), thermoplastic olefins (TPO), polyvinyl chloride (PVC), polyurethanes (PU) and other such materials that offer flexibility, heat stability, a friction enhanced surface, structural integrity in thicker portions, resistance to UV light and water, chemical resistance and ease of processability. All these materials are easily thermoformed or compression molded. Non thermoplastic materials that could possibly be used are thermoset rubber and vinyl coated fabrics. The preferred material group is thermoplastic elastomers for their cost/performance properties. The bottom 15 is thus foldable in at least one direction, preferably all directions.

Along at least a portion of the sides 11, 12, 13, 14 of the liner 10, rigid elements 20, 30 are fastened. The rigid elements do not fold easily, instead they provide areas of the liner with greater rigidity, to enhance the stability of the liner and to provide rigid manipulation gripping areas during handling of a folded liner, for example. The rigid elements may be fastened by welding (heat, RF, ultrasonic) or glueing, for instance, or by forming the flexible bottom portion 15 over already formed rigid elements, leaving holes or other anchor means in the rigid elements that the flexible material of the bottom portion may flow into or around. The flexible bottom 15 thus provides the desired flexibility to the liner 10, to fold the liner for insertion into narrow access openings of a vehicle cargo space, for example, whilst the rigid elements 20, 30 provide a desired rigidity to the liner once the liner is in place in the cargo space. Further use of the rigid elements will be described later. The rigid elements are preferably profiled to conform to the shape of the cargo compartment, and will provide structural stability to the organizer liner when the liner is in place in the cargo compartment. The rigid elements 20, 30 are preferably provided with storage means such as storage bins 25 or bottle holders 30. Further examples of suitable storage means are cup holders, soda and water/milk jug holders, various utility trays and bins, insulated coolers and boxes with or without lids. A portion of the organizer liner bottom preferably covers any wheel wells in the cargo compartment, forming storage trays 40. The storage trays comprise a thicker material than the general bottom portion 15 of the flexible liner material, and is thus sufficiently stiff to provide a semi-rigid storage space. Alternatively, no partition dividers are used, or only used to partition off a relatively small portion of the cargo compartment covered by the organizer liner, for example a divider spanning front to back between two walls of the liner (see, for example, FIG. 22).

Figure 40:
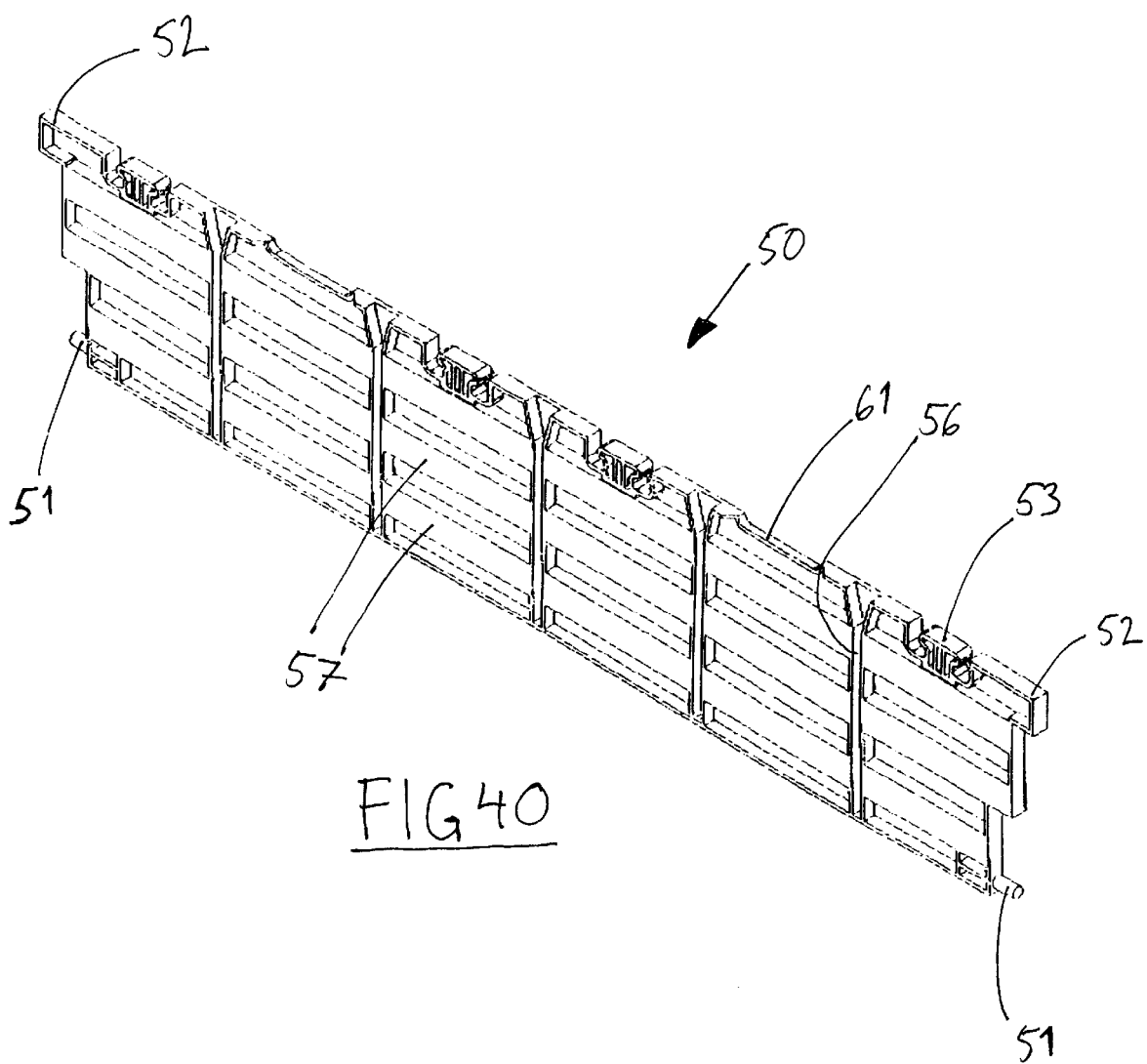
FIG. 40 is an elevational side view of the long partition divider according to FIG. 39.

One example of a joint between the short partition divider and the long partition divider or the side wall of the liner is shown in FIGS. 38 to 43. Also shown (see FIG. 38) are a rigid short partition divider 60 having a handle 61, two short sides 73, a top side 75 and a bottom side 74. A long partition divider 50 is shown in FIGS. 39 and 40. The long divider preferably is generally oblong in shape having two short ends. The long divider further preferably has at least one handle 61, at least one bag holding knob 53, a plurality of short partition divider holding means 56 and a plurality of long partition divider strengthening means. The long partition divider strengthening means are preferably ribs 57 running in the longitudinal direction of the long partition divider, broken only by the short partition divider holding means. Alternatively, the long partition divider may be made of fibre glass reinforced plastic, and would require no such external ribs, all the reinforcement necessary being provided by the glass fibres. A further alternative is to blow mould the long partition divider, making it hollow, and thus obviating the need for external strengthening means. The long partition divider further has a second hinge means 51, arranged to cooperate with a first hinge means (not shown) of the liner wall, and a second holding means 52, arranged to cooperate with a first holding means of the liner wall. The first hinge means is arranged adjacent the bottom portion 15 of the liner. See further FIG. 25.

Figure 41:
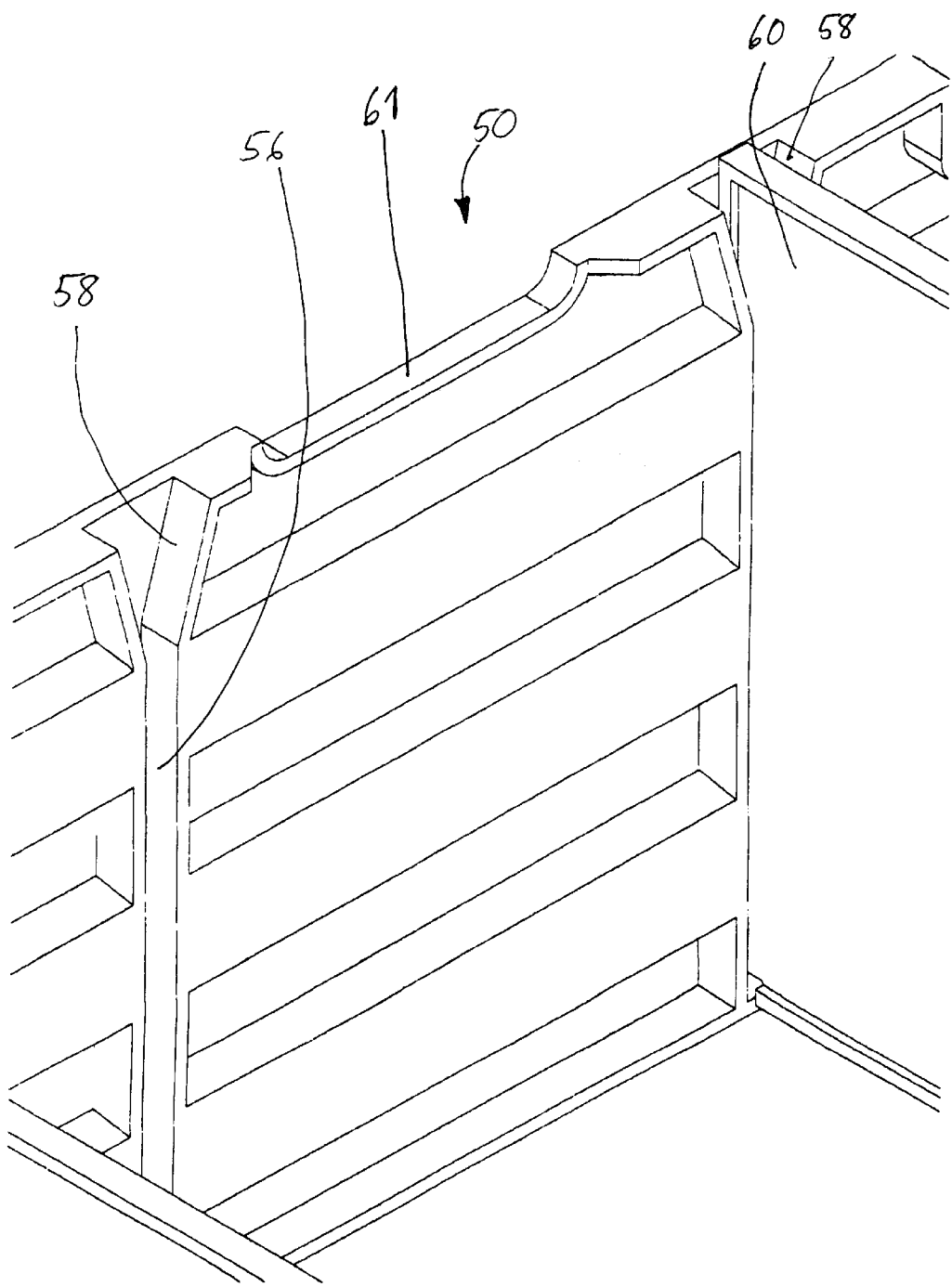
FIG. 41 is a detail elevational side view of a joint between a short partition divider and a long partition divider according to the present invention.
Figure 42:
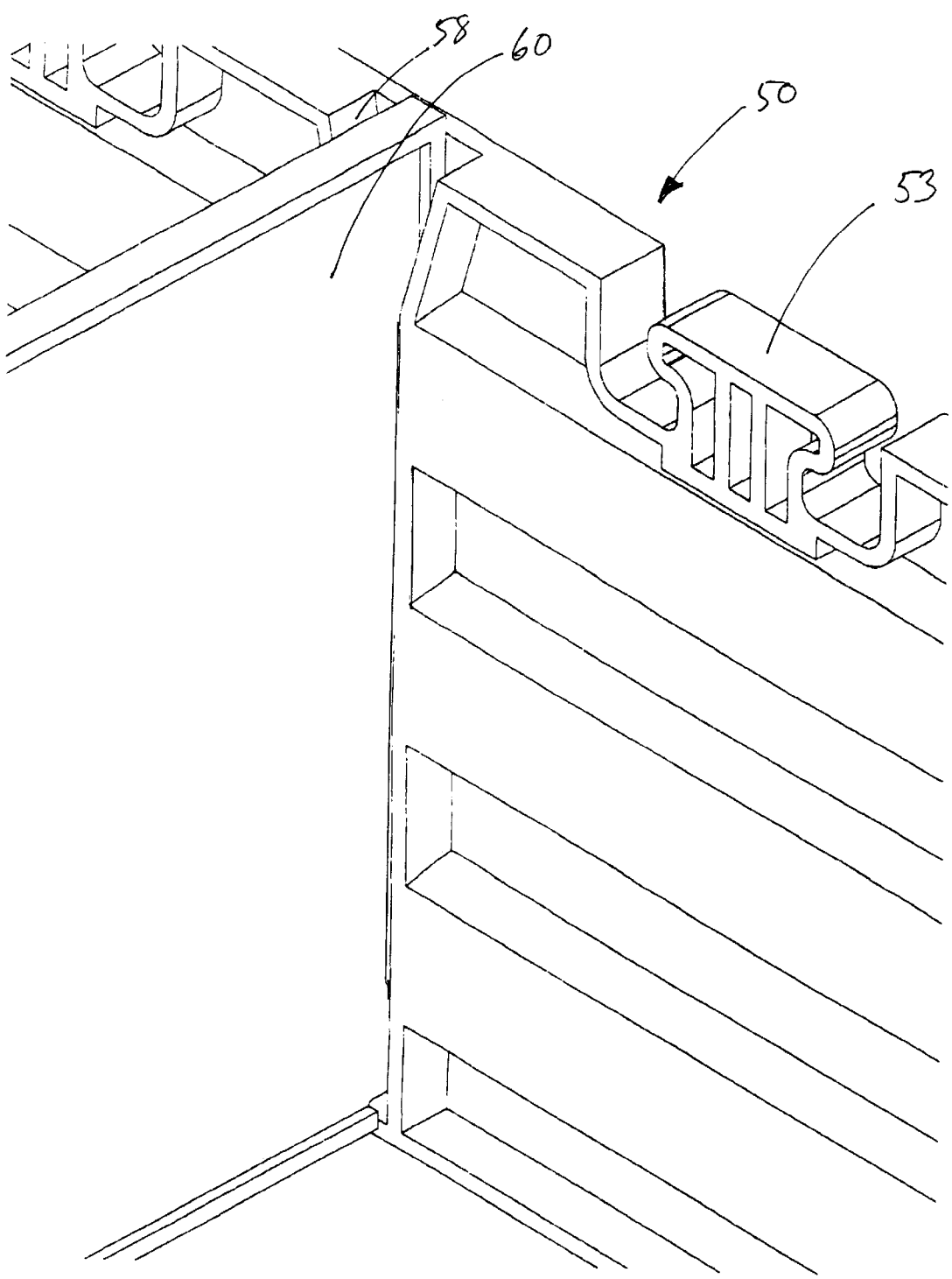
FIG. 42 is a further detail elevational side view of a joint between a short partition divider and a long partition divider according to the present invention.
Figure 43:
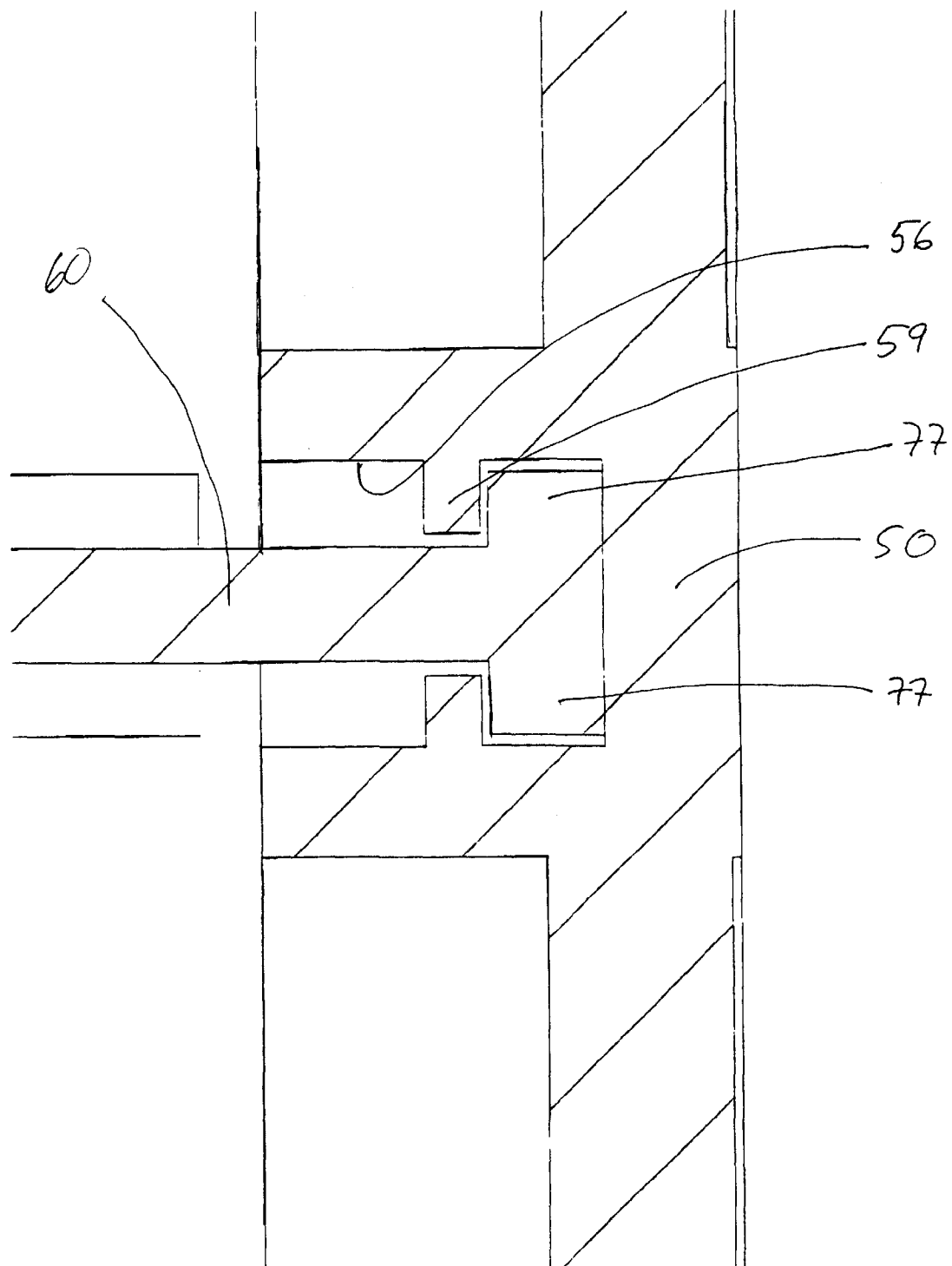
FIG. 43 is a detail top view of a joint between a short partition divider and a long partition divider according to the present invention.

FIG. 41 shows a short partition divider 60 inserted into the short partition divider holding means 56 of a long partition divider 50, adjacent a handle 61 of the long divider. To facilitate insertion of the short divider, the short partition divider holding means preferably has a funnel-shaped entrance portion 58 arranged at the top of the holding means. The short partition divider holding means 56 is preferably shaped as an elongate slot, which has a width corresponding to the width of the short partition divider. FIG. 42 shows a short partition divider 60 inserted into the short partition divider holding means 56 of a long partition divider 50, adjacent a bag holding knob 53 of the long divider. To further enhance the hold of the short partition divider holding means 56 on the short partition divider 60, the end profile of the short end 73 of the short divider is preferably shaped as a T. The flange portion 77 of the T cooperates with protrusions 59 arranged in the short partition divider holding means 56, to positively secure the short divider in the short partition divider holding means, forming a dovetail joint. The second hinge means 51 on the long partition dividers are preferably plastic pins molded at the short ends of the divider. The pin thus mates with the first hinge means, for example a groove or hole in either side walls of the liner or extensions from the bottom 15 of the liner, to allow the long partition divider to lift upward an rotate to a position where the divider is flush with the liner bottom (and the cargo compartment floor).

The organizer liner further preferably comprises blocks 17 shaped in the bottom 15. The blocks align with the long or short partition dividers, to add stability to these dividers.

The liner is thus complete with integrated cup holders and a utility tray. The benefits of the one piece design include: leak-proof environment provided for transporting wet and dirty items; cup holders for passenger use are positioned at the rear of the vehicle; added storage over the wheel wells;

sleek appearance; easily cleanable; maximizes the aesthetics and protection of the whole cargo area from unsightly scratches and damage. The organizer liner 10 preferably includes removable long partition dividers 50. The long partition dividers are held in an upright position by first connection means 55 preferably formed directly in the flexible bottom portion 15 material. To further partition the cargo space, a plurality of short partition dividers 60 are preferably arranged to be mounted upright between two of the long partition dividers 50, in second connection means 65 provided on the long partition dividers. To facilitate handling, the partition dividers may be provided with carrying handle cutouts 61. The removable feature of the partitions advantageously allows for cargo containment when the partitions are upright and a level load floor when the partitions are removed. The partitions are easily stored as part of the entire unit. The partitions are re-configurable in many locations to hold an array of sizes. They are further easily stored and eliminate the shake, rattle and roll of loose items.

The flexible bottom portion 15 of the organizer liner allows the organizer liner to flex sufficiently for ease of entry and removal from the vehicle. The organizer liner also has friction enhanced surface to grip cargo. This allows complete coverage of cargo area with minimized load shift. The rigid elements may run along the entire length of the sides of the liner, thus providing a large area of rigid material for the liner, or they may run only a portion of the side length, as is shown in the drawings. The flexible material of the bottom portion 15 of the liner may also be made thicker in dimension in desired areas, to provide areas of semi-rigid liner material. Different storage means may be formed in these areas, as will be discussed later.

Figure 4:
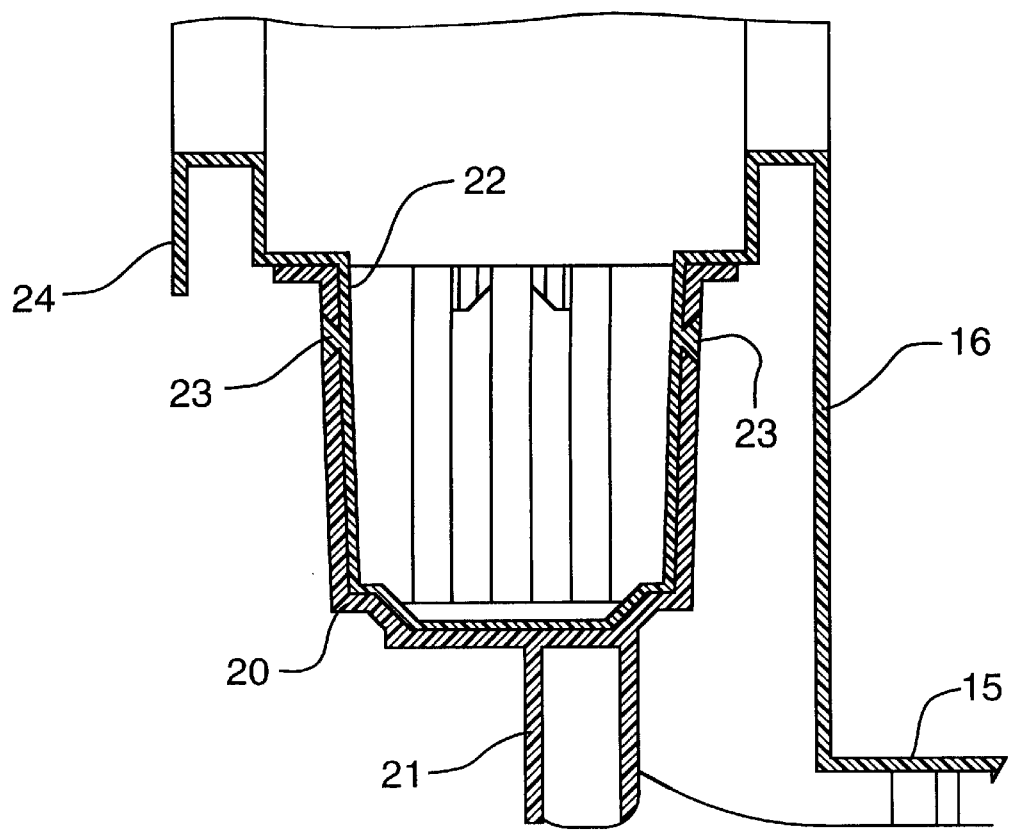
FIG. 4 is the detail B of FIG. 3.
Figure 5:
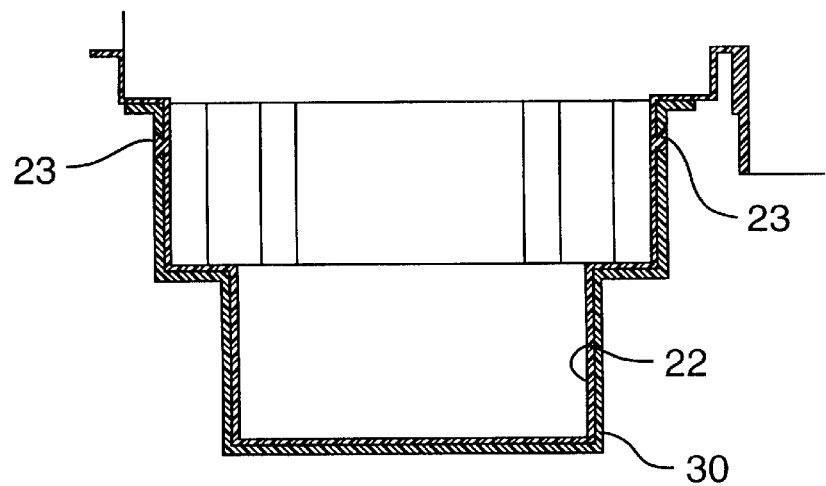
FIG. 5 is the detail C of FIG. 3.

Referring to FIGS. 3 to 5, the organizer liner is preferably manufactured from one piece of flexible material, which is formed over pre-formed rigid elements. FIG. 3 shows a section along the line A–A of FIG. 2, and FIG. 4 shows the detail B of FIG. 3, whilst FIG. 5 shows the detail C of FIG. 3. The flexible bottom portion 15 of the organizer continues to form a flexible side wall 16 which is connected to the rigid element 20, 30 via a piece 22 of the flexible material which has been pressed into the rigid element to conform with its inner shape, and which piece in parts has flown into keyway holes 23 on the rigid element. The rigid element 20, 30 is thus held securely to the flexible material of the rest of the organizer liner 10. The rigid element is preferably molded from polypropylene, polyethylene, ABS or other similar thermoplastics. Fillers such as UV stabilizers, impact modifiers, plasticizers and colorants may be added to all materials (both flexible and rigid) for additional performance or aesthetic properties as required. Rigid elements which are not deep enough to reach to the cargo compartment floor, may be provided with support legs 21. The organizer liner 10 is preferably surrounded by a lip 24 formed by bending its outer edge, to provide added strength to the edge and also to enhance the appearance of the organizer liner.

Figure 6:
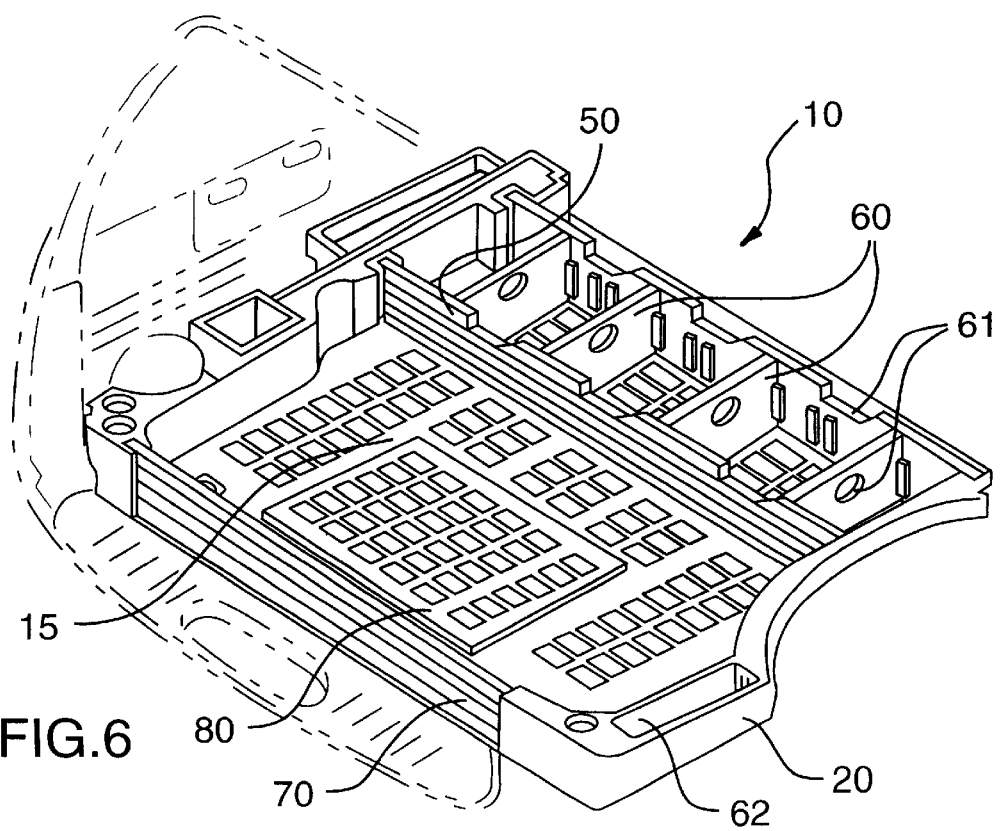
FIG. 6 is an elevational side view of a second embodiment of an organizer liner in accordance with the present invention, having rigid side elements and a removable rear element together with short and long partition dividers.
Figure 7:
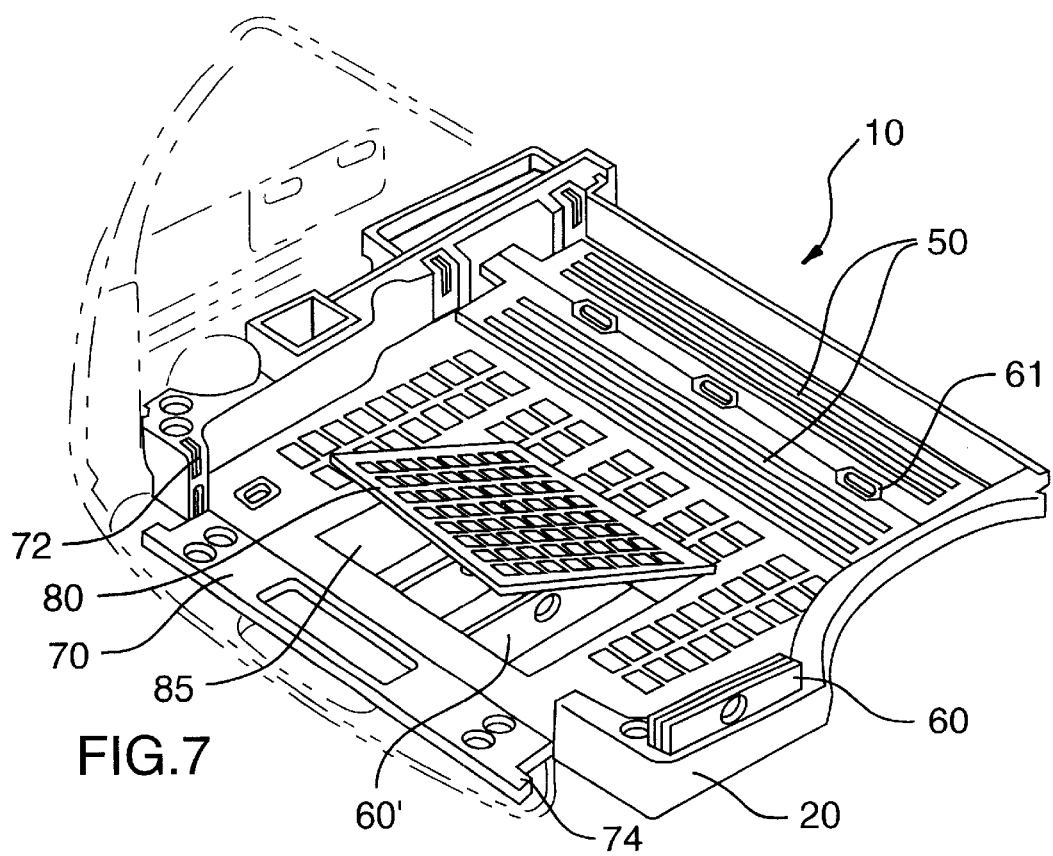
FIG. 7 is an elevational side view of the organizer liner according to FIG. 6, showing various partition dividers in their stoved position and an access panel opened.

Referring to FIGS. 6 and 7, a second embodiment of an organizer liner 10 is shown, having removable long partition dividers 50 and a plurality of short partition dividers 60 preferably arranged to be mounted upright between two of the long partition dividers 50. To facilitate handling, the partition dividers may be provided with carrying handle cutouts 61. One or more of the rigid elements 30 has a short partition divider storage compartment 62. These short partition divider storage compartments provide convenient storage of partitions when not in use and provide easy access to partitions when cargo is to be sorted and secured. The organizer liner further has a pivotable tailgate 70, fastened to the organizer liner 10 via fastening means 71 on the tailgate and fastening means 72 on the organizer liner. Cargo containment is achieved when the pivotable tailgate is in place. Folded downward, it provides a utility tray & cup holder for "picnic environment". An access panel 80 provides access to a sub-floor storage space, preferably also equipped with removable partition dividers 60' and most preferably identical to the short partition dividers 60. The access panel facilitates access to sub-floor storage without removing the organizer liner. The access panel is designed to provide leak proof performance. FIG. 6 shows the partition dividers in place for maximum divided storage space, and FIG. 7 shows the long partition dividers 50 in their folded down storage position and the short partition dividers 60 stored in the short partition divider storage compartment 62. The access panel 80 is here shown slightly ajar to reveal the removable partition dividers 60'. The flexible bottom portion 15 of the organizer liner 10 preferably runs unbroken by any openings inside and covering the sub-floor storage compartment of the cargo compartment of the vehicle. In this way, a spill and leak-proof compartment is created.

Figure 7A:
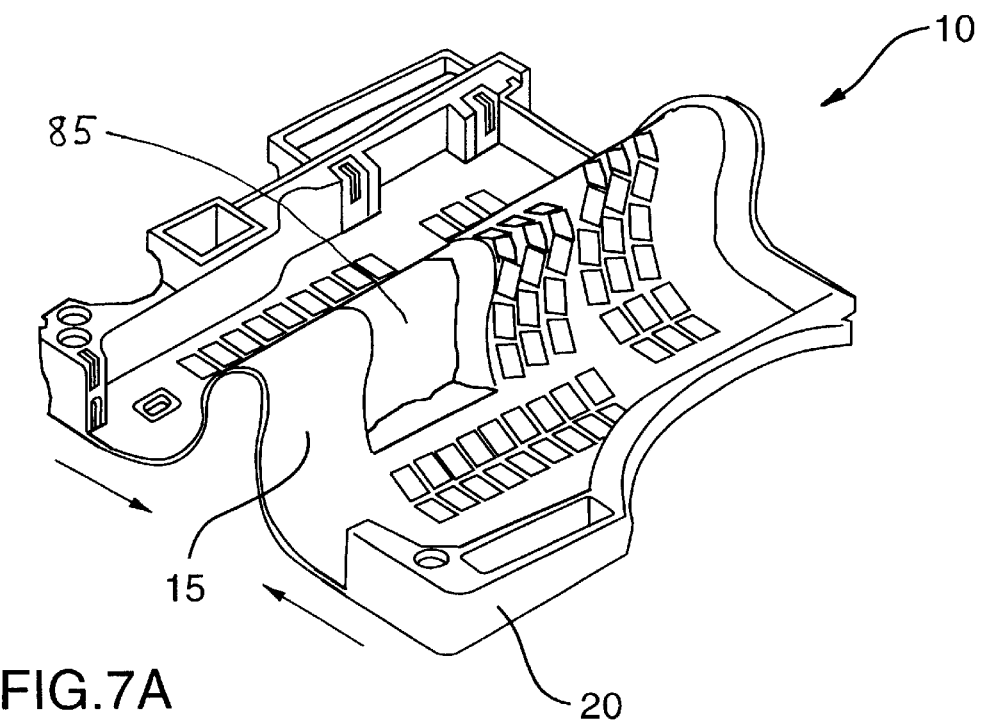
FIG. 7A is an elevational side view of the organizer liner in according to FIG. 7, showing the liner in a folded state with the dividers removed.
Figure 7B:
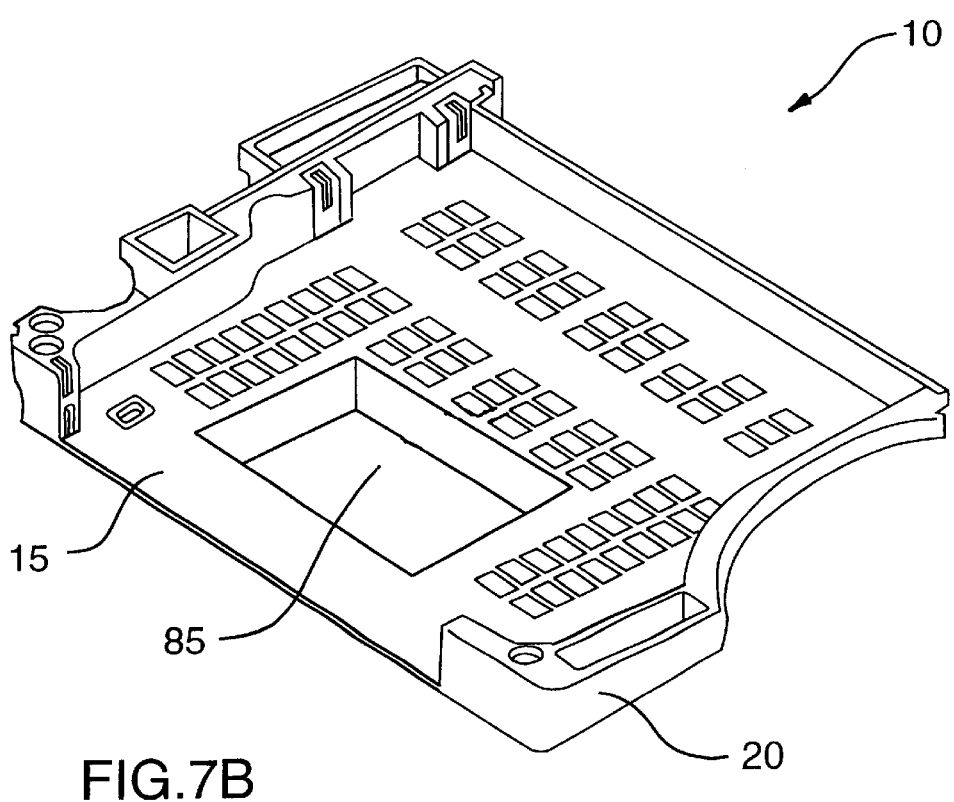
FIG. 7B is an elevational side view of the organizer liner in according to FIG. 7A, showing the liner in a spread out state.

In FIGS. 7A and 7B the organizer liner is shown without any dividers in place. In FIG. 7A, the liner is shown in a folded together state, where the flexible bottom 15 has bent to allow the liner to be reduced in size. The rigid element 20 is not deformed. The liner is held in this state and placed into the cargo compartment of a vehicle, where the flexible bottom is stretched out and the sides of the liner aligned with the sides of the cargo compartment, as shown in FIG. 7B.

Figure 8:
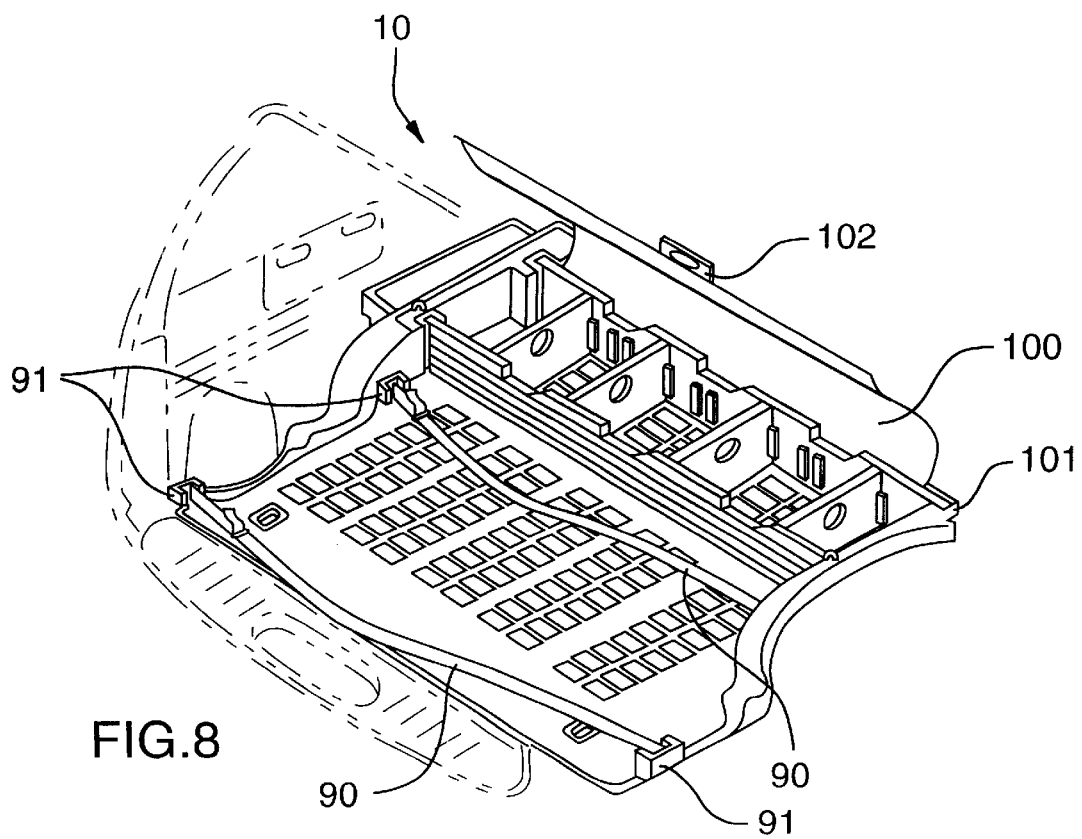
FIG. 8 is an elevational side view of a third embodiment of an organizer liner in accordance with the present invention, having rigid side elements, cargo straps, retractable shade and short and long partition dividers.

Referring to FIG. 8, a third embodiment of an organizer liner 10 is shown, having cargo straps 90 attached to cargo strap anchoring means 91 arranged adjacent or integral with the rigid elements. The organizer liner further has a retractable concealment shade 100, preferably arranged at the front side of the organizer liner. The shade is retractable into a housing 101, utilizing for instance a "night-blind" mechanism. To facilitate manipulation of the shade 100, a shade handle 102 is preferably arranged on a leading edge of the shade.

Figure 9:
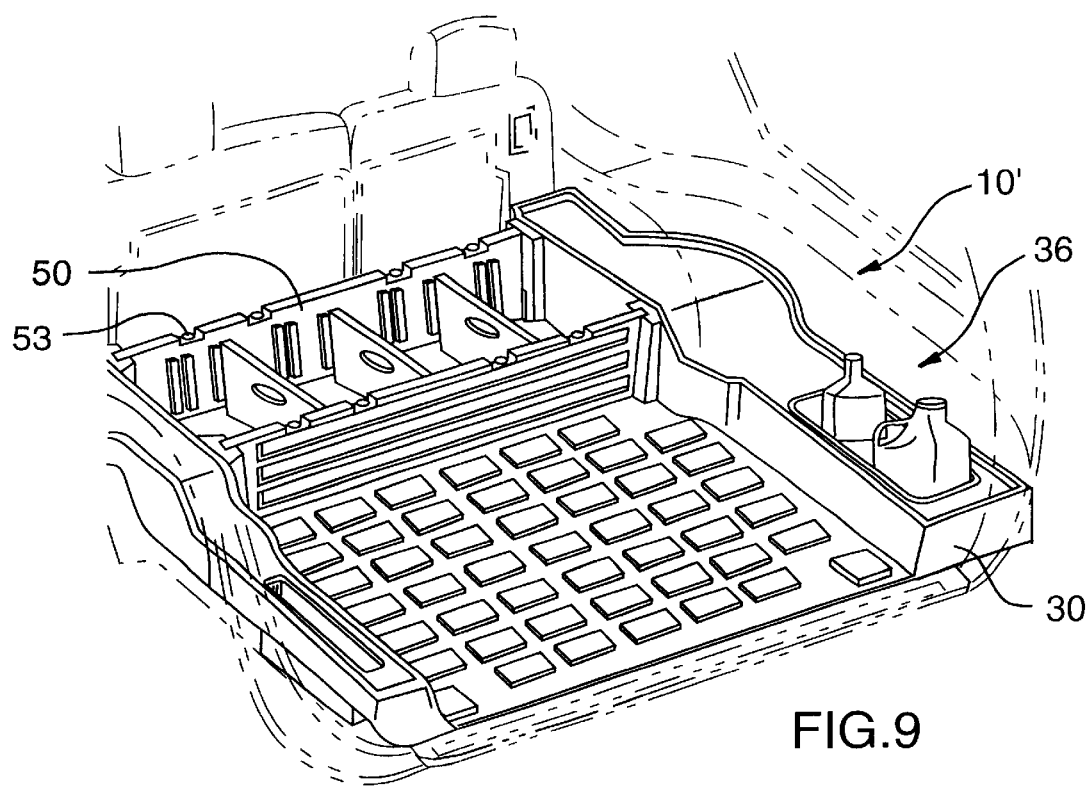
FIG. 9 is an elevational side view of a fourth embodiment of an organizer liner in accordance with the present invention, having rigid side elements together with short and long partition dividers.

Referring to FIG. 9, a fourth embodiment of an organizer liner 10 is shown, having an extra-wide storage 36 arranged on one rigid element 30. Further, the long partition dividers 50 are provided with bag holding knobs 53, to facilitate the retention of plastic garbage or shopping bags.

Figure 10:
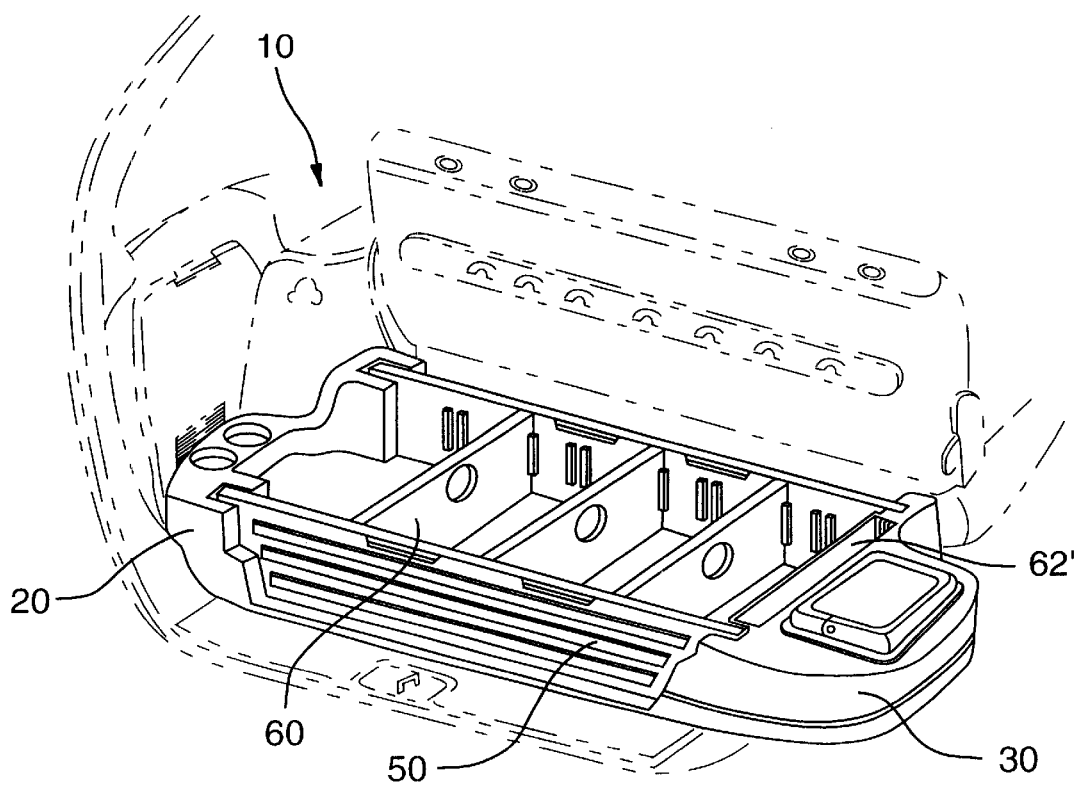
FIG. 10 is an elevational side view of a fifth embodiment of an organizer liner in accordance with the present invention, having rigid side elements together with short and long partition dividers.
Figure 11:
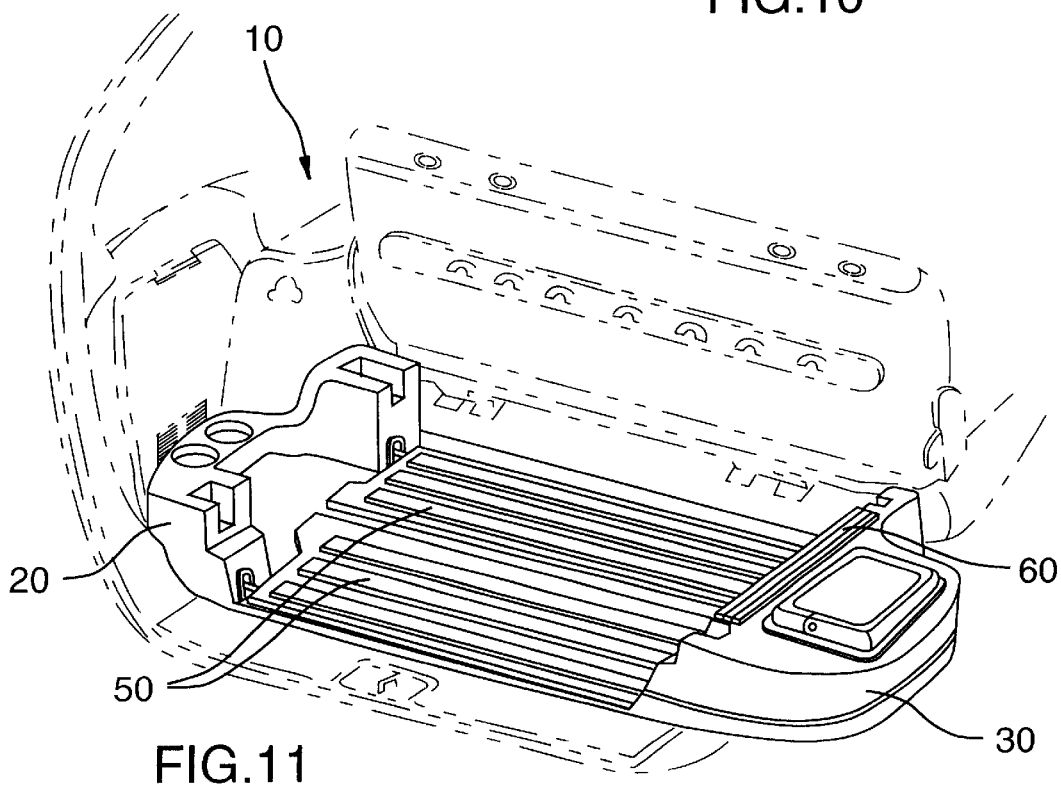
FIG. 11 is the organizer liner according to FIG. 10, showing the partition dividers in a stoved position.

Referring to FIGS. 10 and 11, a fifth embodiment of an organizer liner 10 is shown, having rigid elements 20, 30, long partition dividers 50 and short partition dividers 60, as shown earlier. Furthermore, a short partition divider storage bin 62' is provided in one rigid element. The particular embodiment is intended for use where the available cargo compartment is small, compared to the earlier embodiments. FIG. 10 shows the organizer liner where the partition dividers are set up for maximum divided storage, and FIG. 11 shows the organizer liner with folded down long partition dividers 50 and stored short partition dividers 60, for providing access to a maximum cargo floor space. Short and long partition dividers are preferably situated toward the rear seat. This allows an open cargo area at the rear of the vehicle for large awkward items such as golf clubs, suitcases, etc. Alternatively, the dividers may be arranged at the rear of the organizer liner, to provide easy access to heavy objects, for instance.

Figure 13:
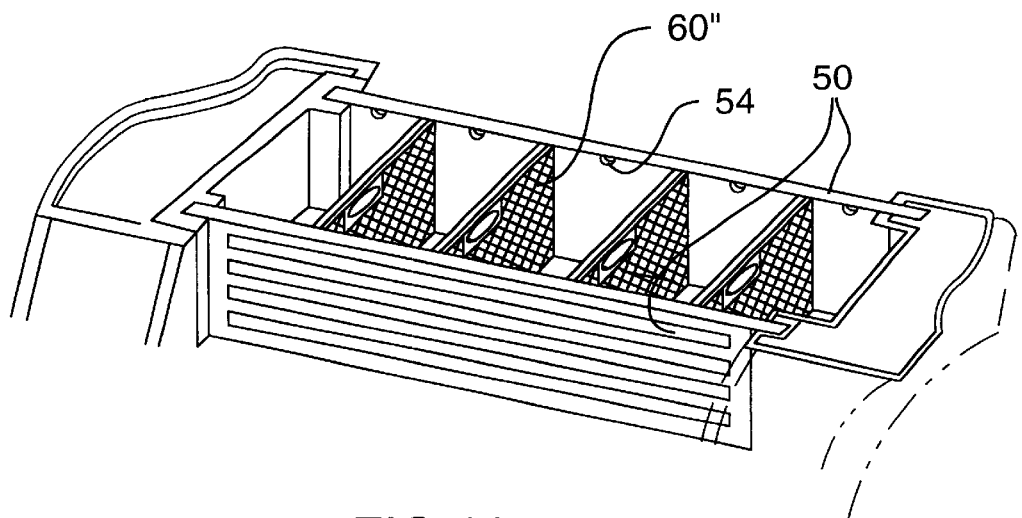
FIG. 13 is an elevational side view of a part of an organizer liner in accordance with the present invention, having collapsible second short partition dividers according to FIG. 13.
Figure 12:
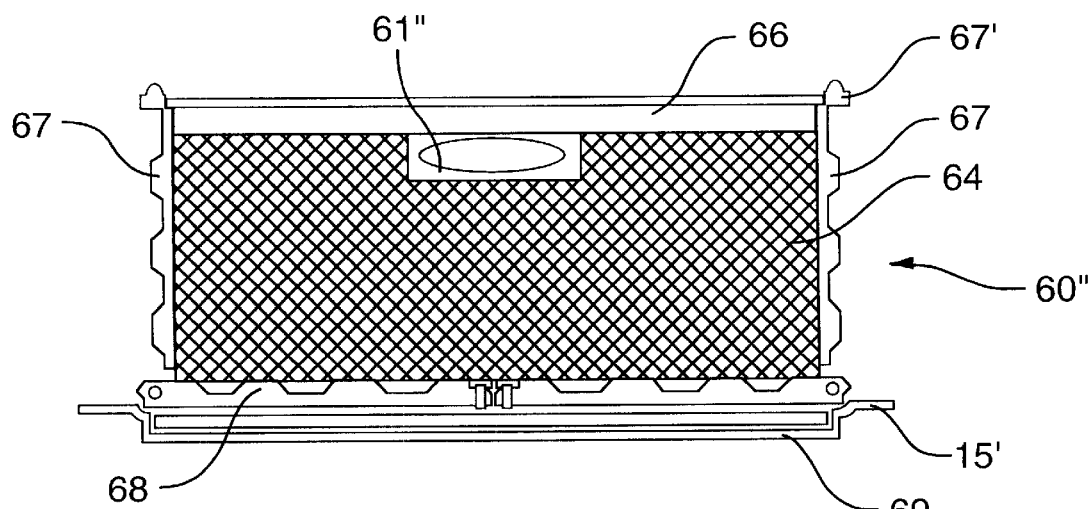
FIG. 12 is a side view of a collapsible second short partition divider according to the present invention.
Figure 14:
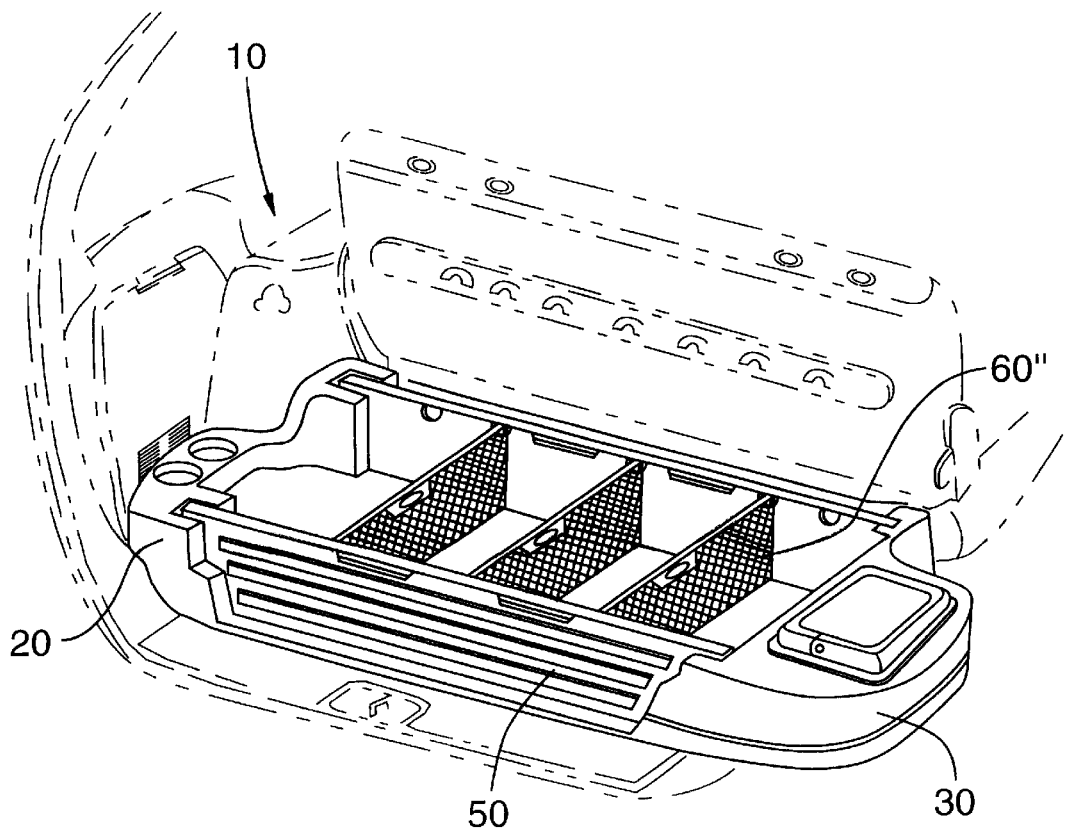
FIG. 14 is an elevational side view of an organizer liner according to FIG. 10, having collapsible second short partition dividers according to FIG. 13.

Referring to FIGS. 12, 13 and 14, the short partition dividers 60" alternatively comprise a rigid, foldable frame construction holding a net in a stretched-out position. The frame preferably comprises a top portion 66, two side portions 67 and a bottom portion 68. The net 64 is held clamped along the length of the top portion and along the length of the bottom portion. The two side portions 67 preferably fold along the top portion 66, to allow the short partition divider 60" to be completely stored in a net recess 69 in the floor 15' of the organizer liner. The two side portions have hook means 67', which cooperate with cutouts 54 in the long partition dividers 50 in the raised position of the short partition dividers 60", to hold the short partition divider in an upright position. FIG. 14 shows an embodiment similar to that of FIGS. 10 and 11, but which utilizes the short partition dividers 60" just described. To facilitate manipulation of the divider, a grab handle 61" is arranged adjacent the top portion 66 of the frame. The grab handle is preferably soft.

Figure 14B:
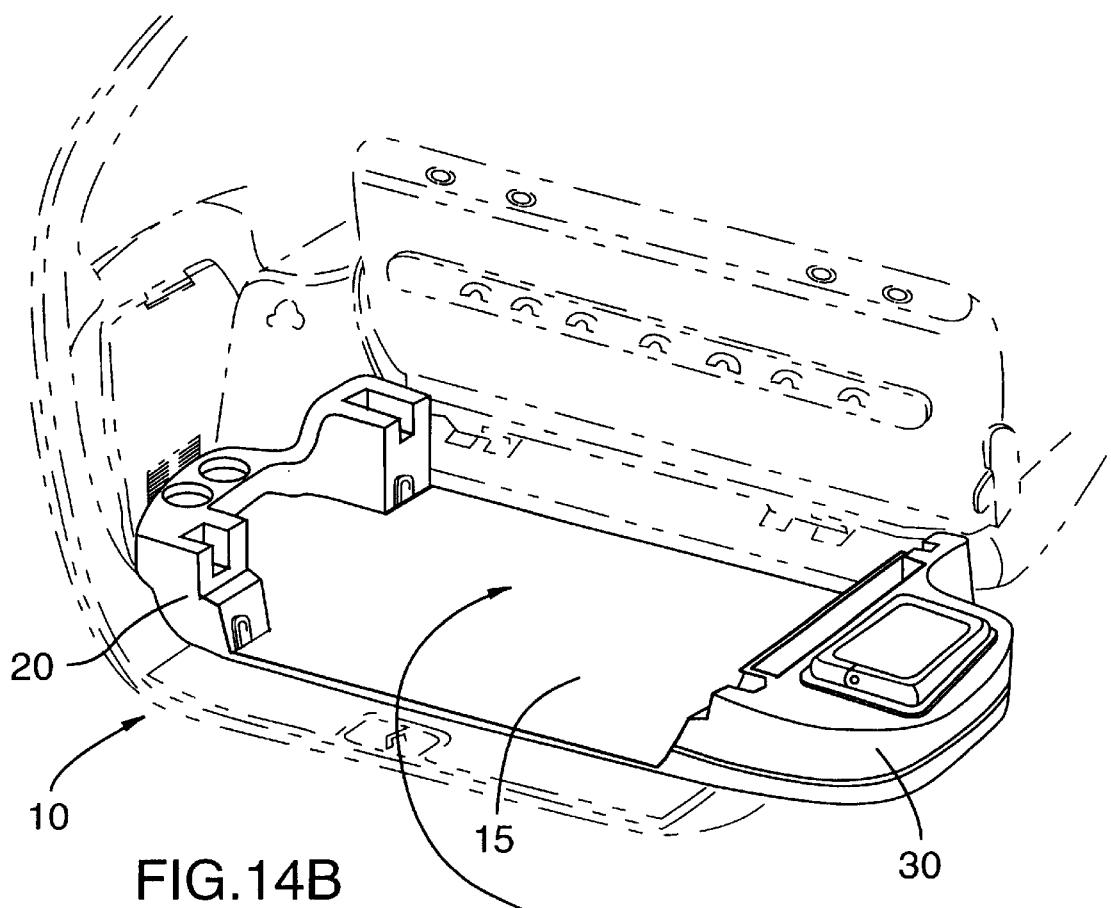
FIG. 14B is an elevational side view of the organizer liner in according to FIG. 14A, showing the liner in a spread out state.
Figure 14A:
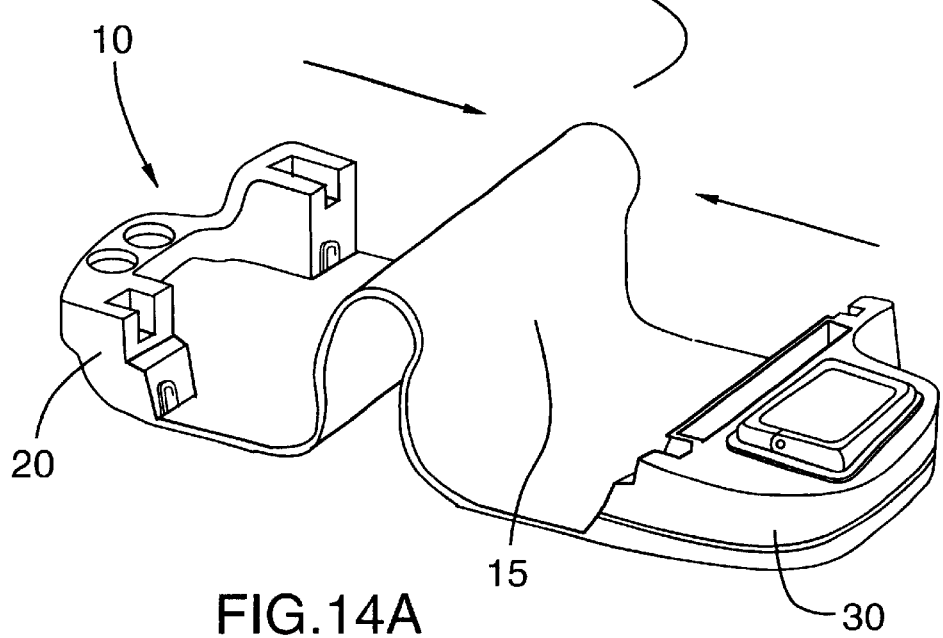
FIG. 14A is an elevational side view of the organizer liner in according to FIG. 14, showing the liner in a folded state with the dividers removed.

In FIGS. 14A and 14B the organizer liner is shown without any dividers in place. In FIG. 14A, the liner is shown in a folded together state, where the flexible bottom 15 has bent to allow the liner to be reduced in size. The rigid elements 20, 30 are not deformed. The liner is held in this state and placed into the cargo compartment of a vehicle, where the flexible bottom is stretched out and the sides of the liner aligned with the sides of the cargo compartment, as shown in FIG. 14B.

Figure 15:
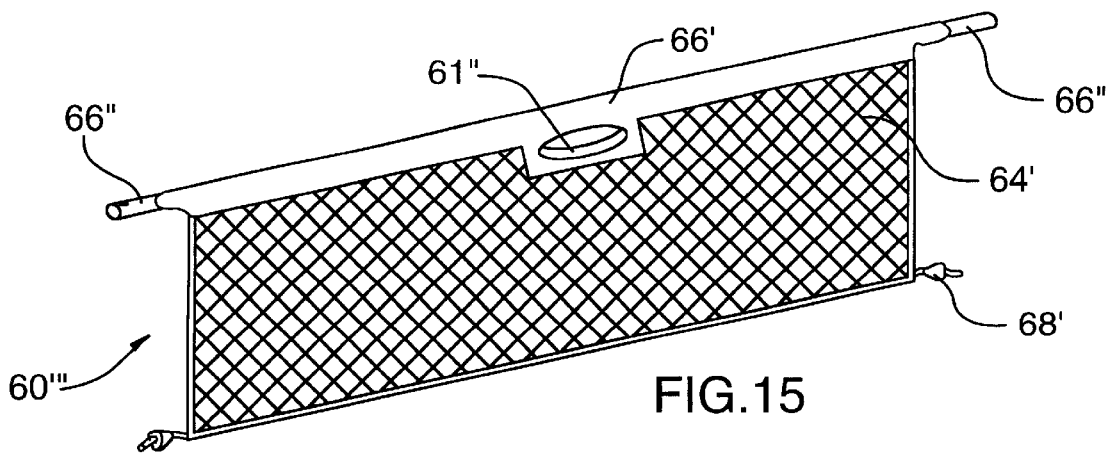
FIG. 15 is an elevational side view of a collapsible third short partition divider in accordance with the present invention.
Figure 16:
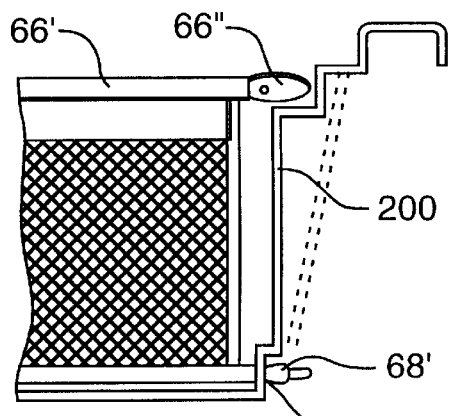
FIG. 16 is a detail view showing the collapsible third partition divider according to FIG. 15 and its mounting means on the organizer liner.
Figure 17:
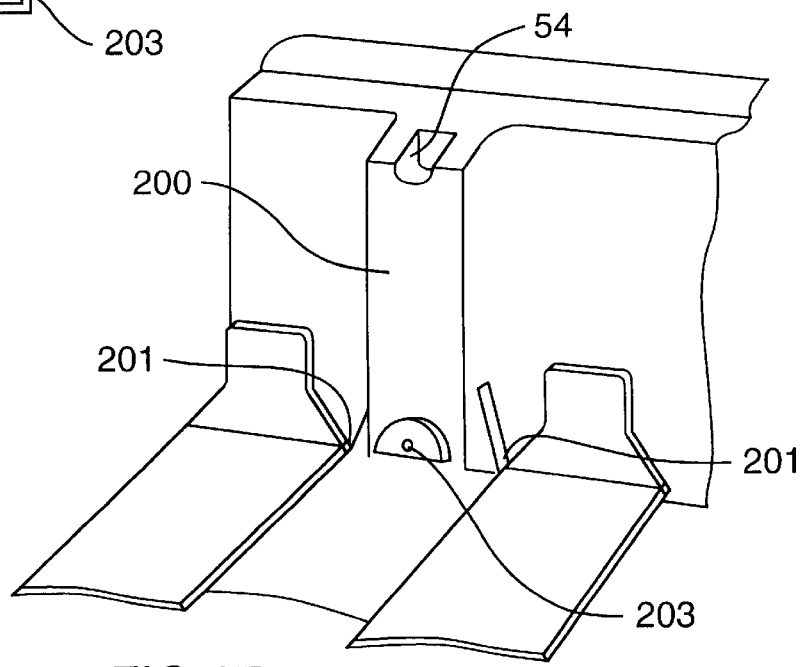
FIG. 17 is a detail elevational side view of the mounting means on the organizer liner for the collapsible third partition divider according to FIG. 15.

A further variation of short partition dividers having a net is shown in FIGS. 15 to 17. Here, the short partition divider 60''' comprises a top bar 66' onto which a net 64' is fastened. The top bar has protruding ends 66", which cooperate with the aforementioned cutouts 54 of the long partition dividers. The cutouts, for this embodiment of short partition divider, is arranged on top of a substantially vertical protrusions 200 arranged on a wall of the liner or on a side of the long partition dividers.

The protrusions have an opening 203 arranged adjacent the liner floor, for receiving the end 68' of an elastic rope, or similar, fastened along the entire lower side of the net 64'. The end of the elastic rope is crimped with a metal stop, or similar, after assembly into the opening 203. Preferably, also the short sides of the net has an elastic rope, or similar, fastened along their entire sides. The sides of the wall of the liner or the sides of the long partition dividers further have locator means 201 for the top bar 66' and its ends 66". Thus, the short partition divider 60''' can fold down if the ends 66" are lifted out of the cutouts 54 and the top bar 66' is stored in the locator means 201. The net type short partition divider may be arranged between two long partition dividers, between two side walls of the liner or between a long partition divider and a side wall of the liner.

Figure 18:
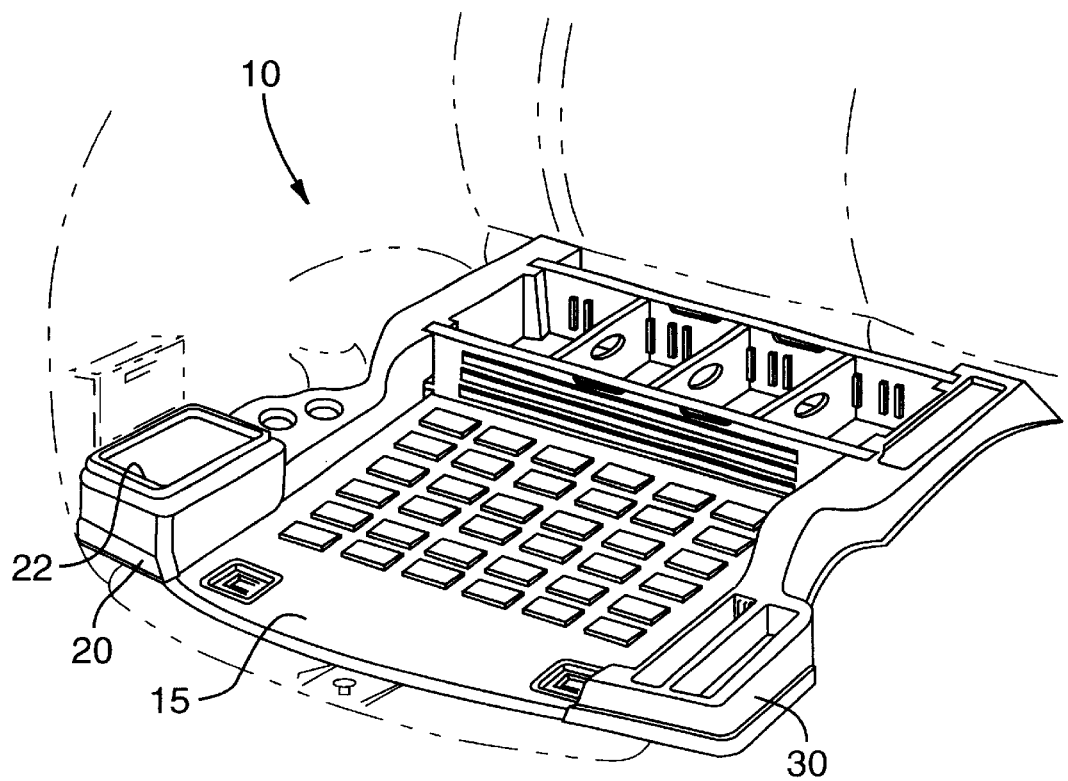
FIG. 18 is an elevational side view of a sixth embodiment of an organizer liner in accordance with the present invention, having rigid side elements together with short and long partition dividers.

FIG. 18 shows a sixth embodiment of an organizer liner 10. The rigid elements 20, 30 here have a removable cooler storage compartment 22. Also shown is the possibility to provide a custom floor pattern, by forming the pattern in the flexible material of the bottom 15 of the liner during the manufacturing process. Custom logos are also possible, depending upon the desired look of the product. The cooler is integral with the organizer liner. It is user friendly to allow easy accessibility to cool drinks or ice containment.

Figure 18B:
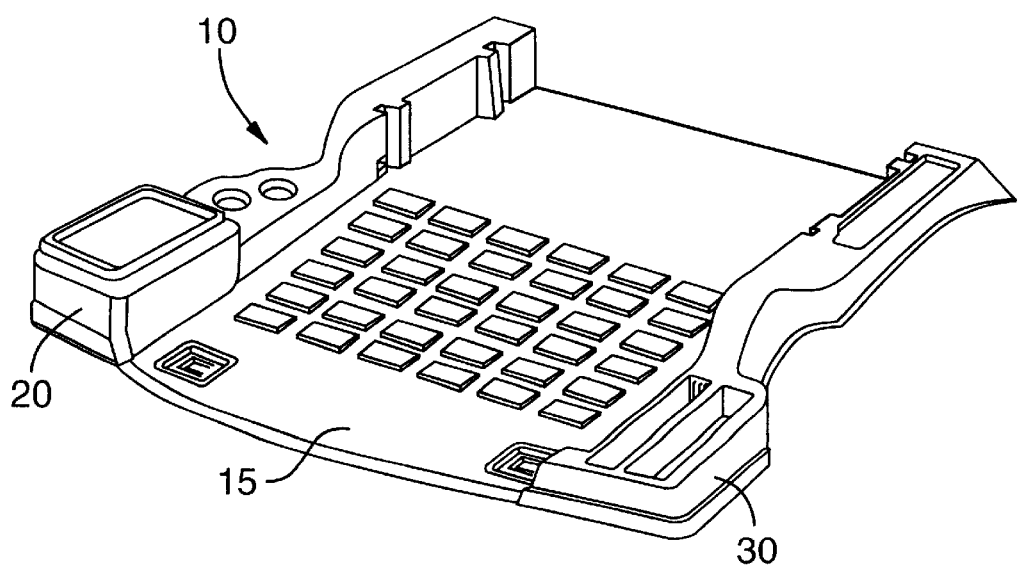
FIG. 18B is an elevational side view of the organizer liner in according to FIG. 18A, showing the liner in a spread out state.
Figure 18A:
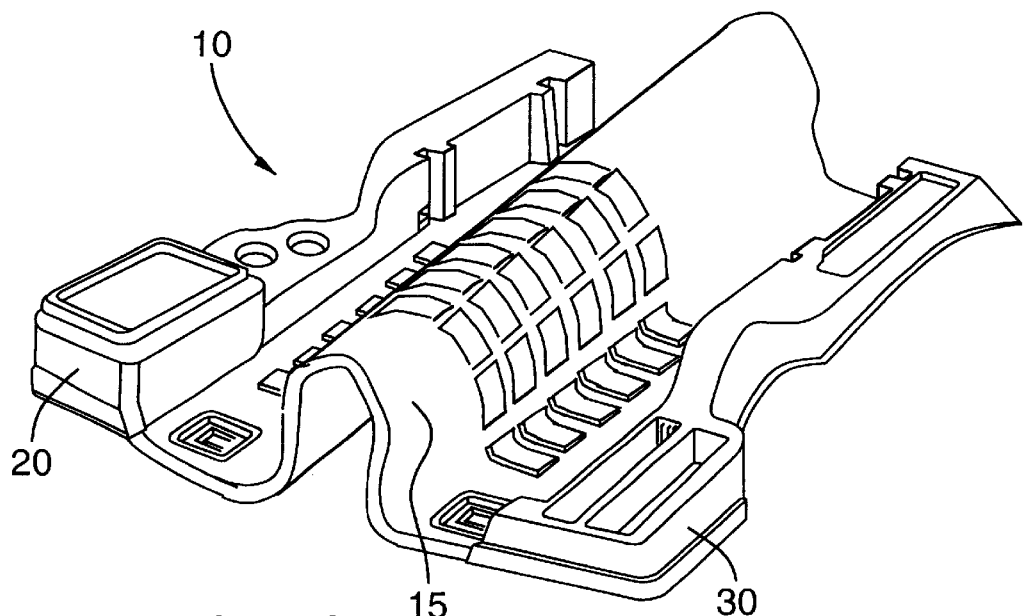
FIG. 18A is an elevational side view of the organizer liner in according to FIG. 18, showing the liner in a folded state with the dividers removed.

In FIGS. 18A and 18B the organizer liner is shown without any dividers in place. In FIG. 18A, the liner is shown in a folded together state, where the flexible bottom 15 has bent to allow the liner to be reduced in size. The rigid elements 20, 30 are not deformed. The liner is held in this state and placed into the cargo compartment of a vehicle, where the flexible bottom is stretched out and the sides of the liner aligned with the sides of the cargo compartment, as shown in FIG. 18B.

Figure 18C:
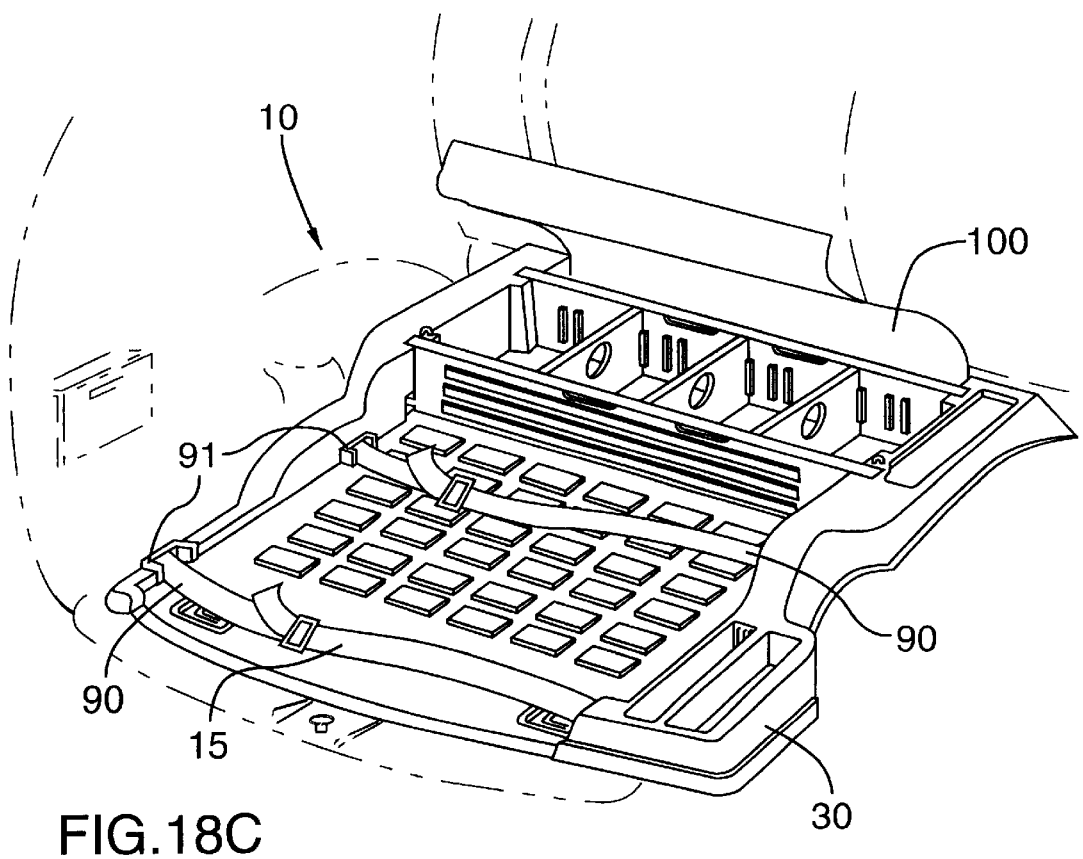
FIG. 18C is an elevational side view of an organizer liner similar to the liner shown in FIG. 18, having luggage straps and a cargo cover.

Similar to the embodiment shown in FIG. 8, the organizer liner 10 is shown having cargo straps 90 attached to cargo strap anchoring means 91 arranged adjacent or integral with the rigid elements (see FIG. 18C). The organizer liner further has a retractable concealment shade 100, preferably arranged at the front side of the organizer liner. The shade is retractable into a housing, utilizing for instance a "nightblind" mechanism. To facilitate manipulation of the shade 100, a shade handle is preferably arranged on a leading edge of the shade (analogous to FIG. 8).

Figure 19:
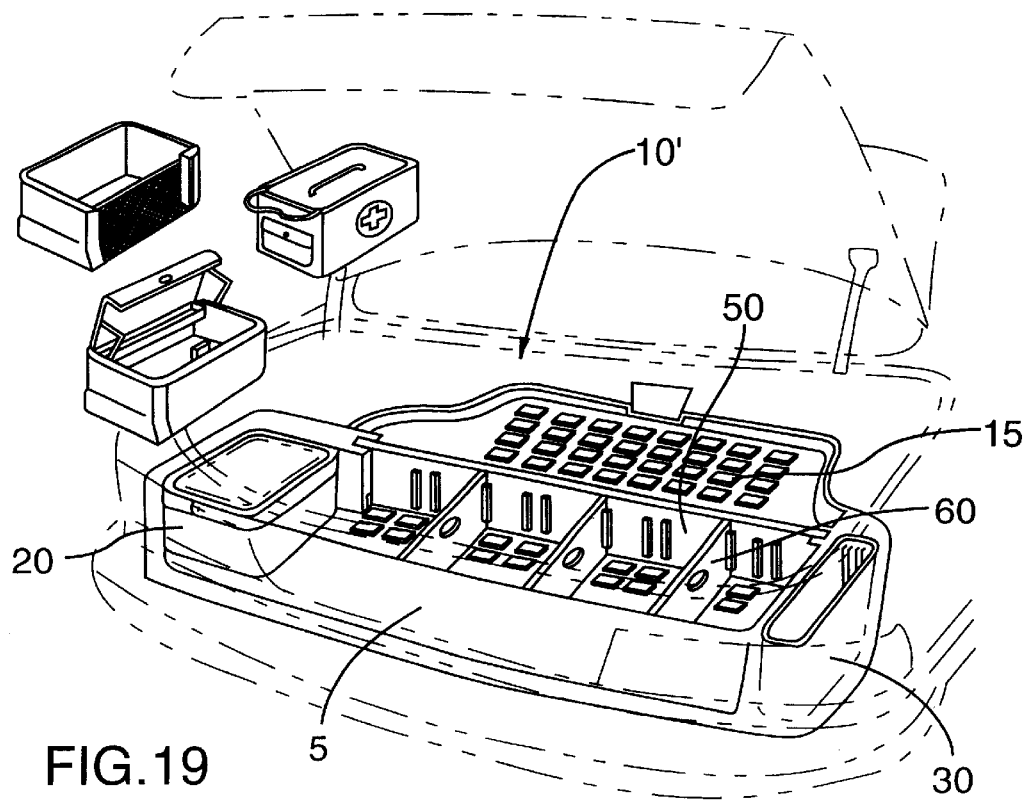
FIG. 19 is an elevational side view of a seventh embodiment of an organizer liner in accordance with the present invention, having rigid side elements together with short and long partition dividers and being particularly adapted to fit a trunk of an automobile.
Figure 20:
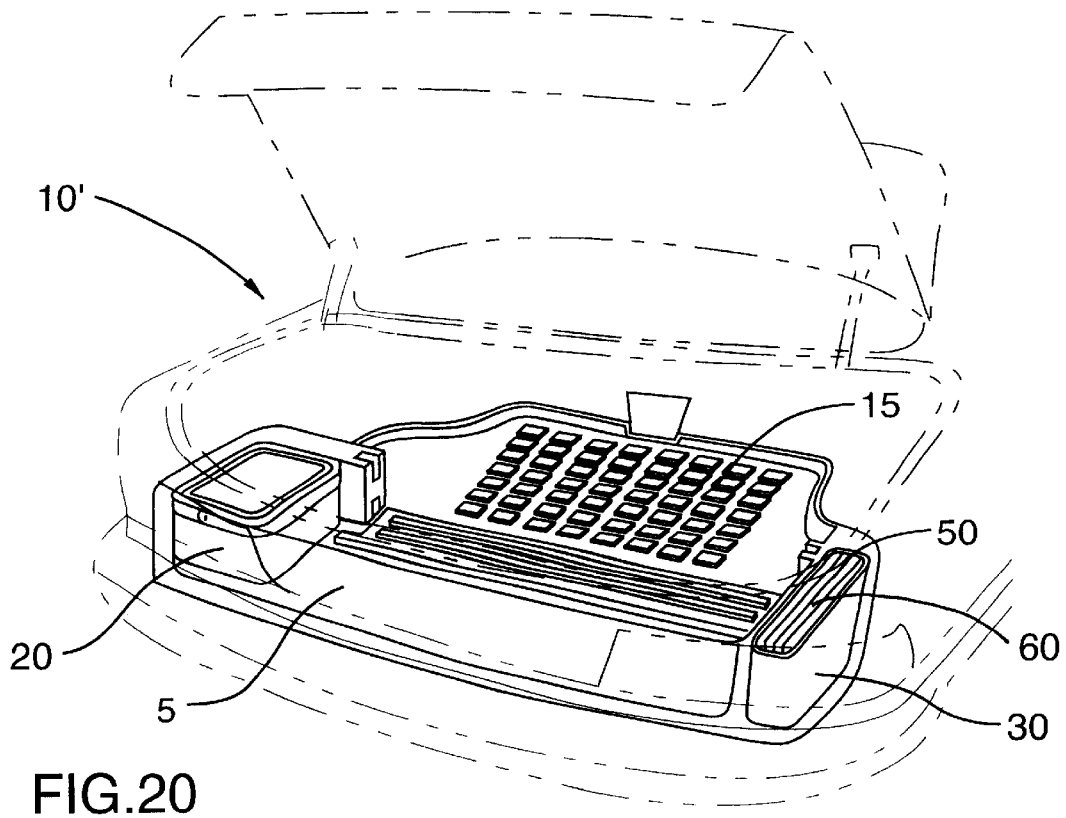
FIG. 20 is an elevational side view of the organizer liner according to FIG. 19, showing the partition dividers in a stoved position.
Figure 21:
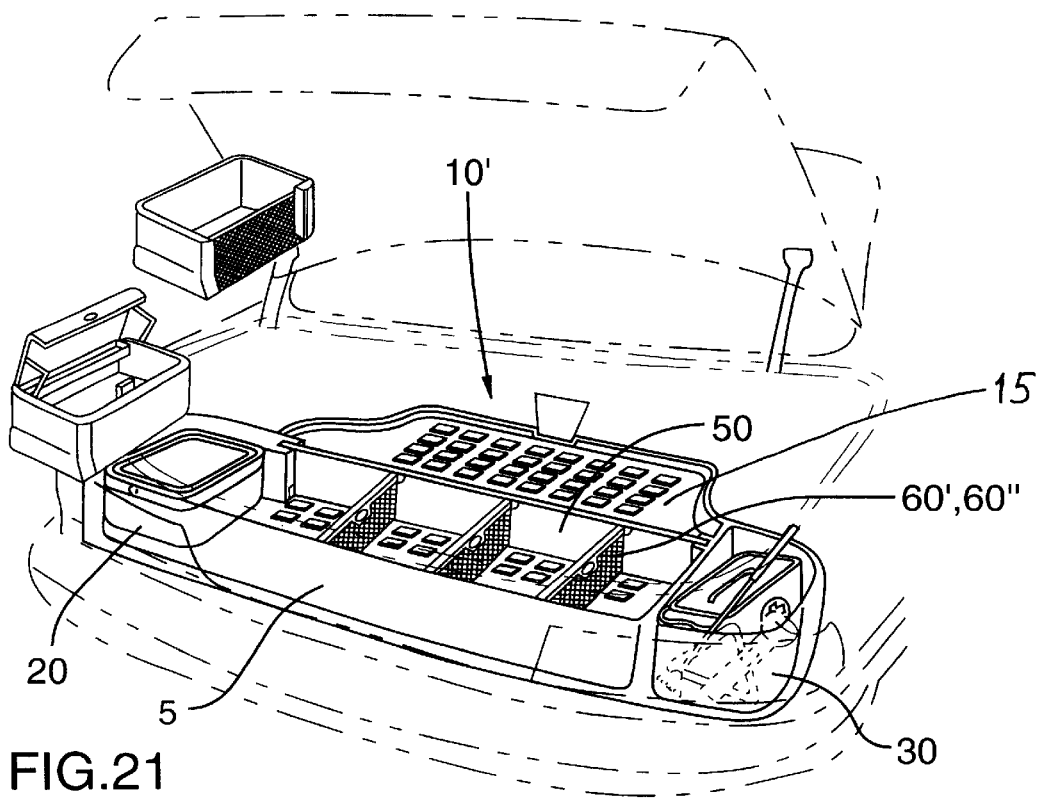
FIG. 21 is an elevational side view of an eighth embodiment of an organizer liner in accordance with the present invention, having rigid side elements together with short and long partition dividers and being particularly adapted to fit a trunk of an automobile.
Figure 22:
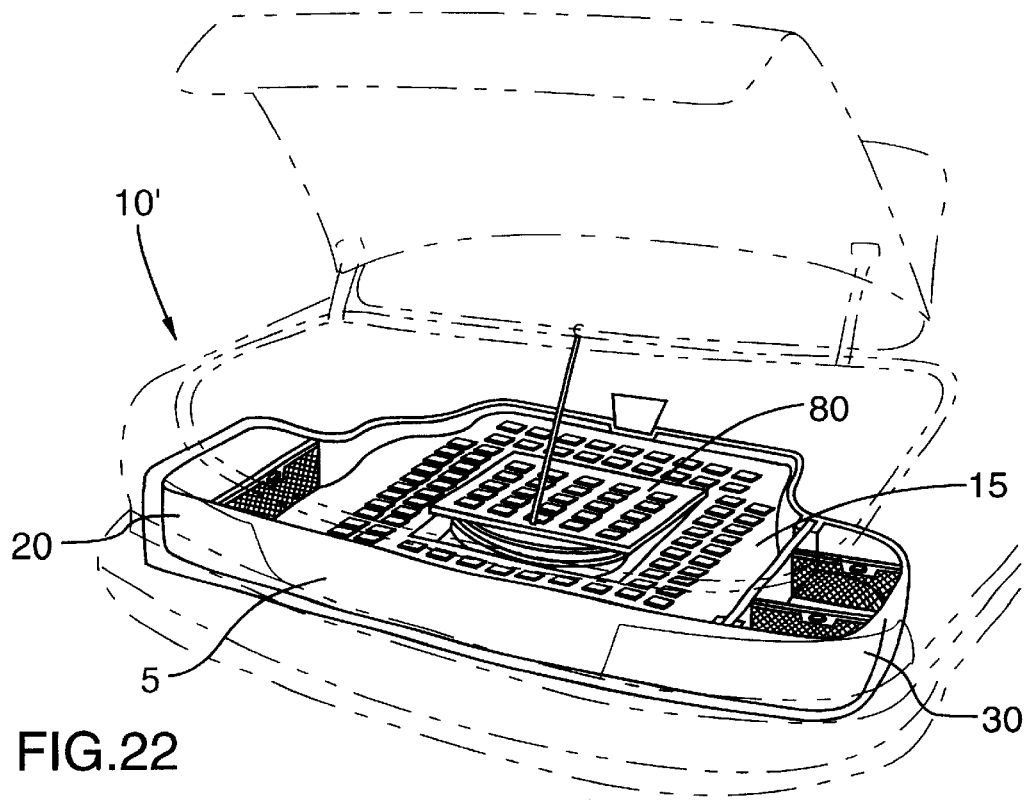
FIG. 22 is an elevational side view of a ninth embodiment of an organizer liner in accordance with the present invention, having rigid side elements together with short and long partition dividers and being particularly adapted to fit a trunk of an automobile.
Figure 23:
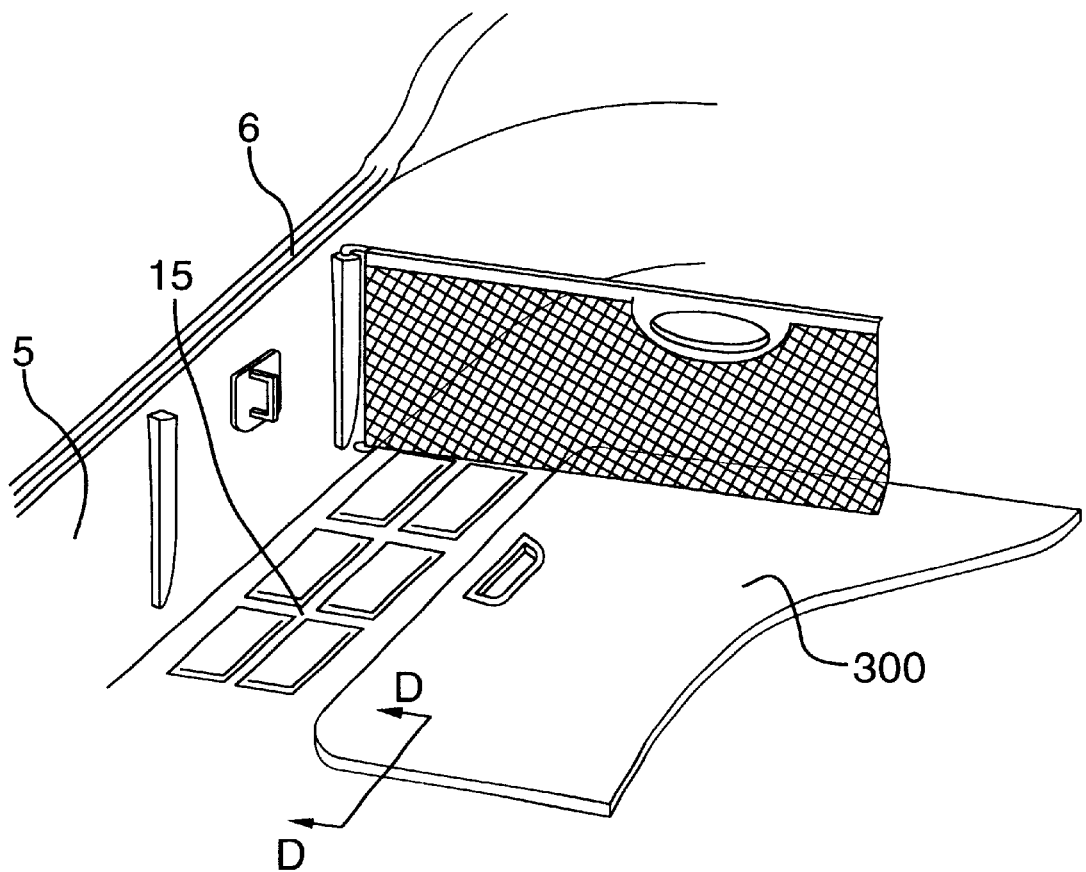
FIG. 23 is a detail elevational side view of the arrangement of the organizer liners of FIGS. 19 to 22 in the rear of the cargo compartment.
Figure 24:
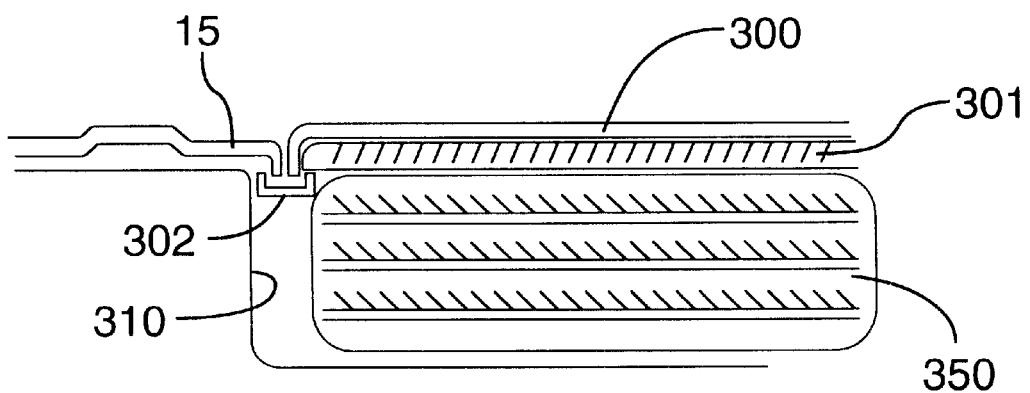
FIG. 24 is a section along the line D–D of FIG. 23.

Referring to FIGS. 19 to 24, further embodiments of an organizer liner 10' are shown, suitable for use in the trunk of an automobile. The cargo space in this case is usually characterized by being less accessible, because the opening into the cargo space is often smaller than the cargo space itself. The liner according to the invention lends itself perfectly to this application, since the bottom of the liner is flexible permitting the liner to be at least partially folded before insertion into the cargo space. After the liner is inside the cargo space, the liner is unfolded and can reach the farthest ends of the cargo space. Thus, a full use of the cargo space can be coupled to the protective and organizational benefits of using the organizer liner according to the invention. FIG. 19 shows an organizer liner having a flexible bottom 15, a flexible rear wall 5 and rigid side elements 20, 30. Further, at least one long partition divider 50 and a plurality of short partition dividers 60 are used, as described earlier. The rigid elements may generally comprise storage means such as coolers, first aid kits, storage for the short partition dividers and lockable or non-lockable storage boxes. FIG. 20 shows the organizer liner of FIG. 19 with the dividers in a stoved position. FIG. 21 shows an organizer liner for an automobile trunk, where the short partition dividers are of the net type described earlier. FIG. 22 shows an organizer liner having an access hatch to a spare tire compartment. FIGS. 23 and 24 show in more detail how an organizer liner for an automobile trunk would have a lip 6 protruding from the rear wall 5, to cover the sill plate of the automobile. The organizer liner lip may also completely obviate the need for a sill plate, as is used today. The divider shown as a net divider may, of course, be a solid type divider of either long or short type. FIG. 24 shows the section along line D–D of FIG. 23, showing the spare tire 350 in its well 310. The organizer liner 10' comprises a spare wheel hatch 300 which cooperates with a channel element 302 bonded to the flexible bottom 15 of the organizer liner. An insert 301 may be provided between the spare tire and the hatch, to prevent the hatch from bending under heavy load.

In FIGS. 22A and 22B the organizer liner is shown without any dividers in place. In FIG. 22A, the liner is shown in a folded together state, where the flexible bottom 15 and the rear wall 5 have bent to allow the liner to be reduced in size. The rigid elements 20, 30 are not deformed. The liner is held in this state and placed into the cargo compartment of a vehicle, where the flexible bottom is stretched out and the sides of the liner aligned with the sides of the cargo compartment, as shown in FIG. 22B.

Figure 25:
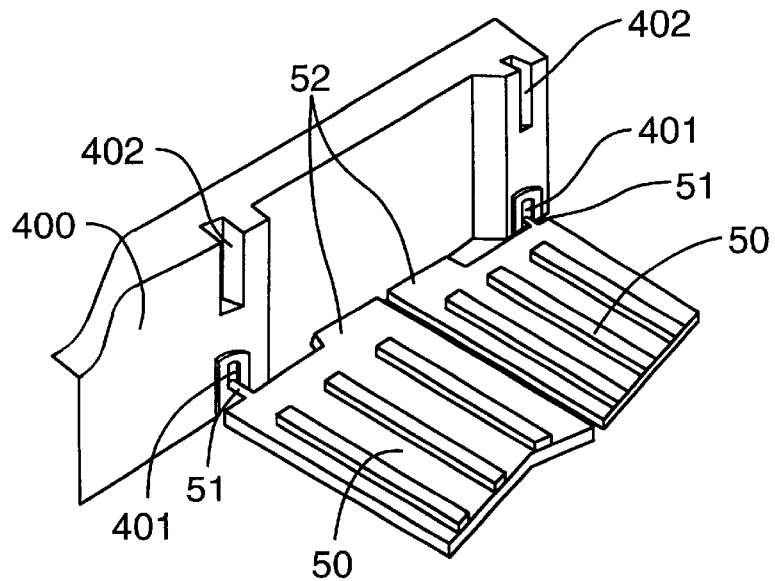
FIG. 25 is a detail elevational side view of the connecting means of the long partition dividers according to the present invention.

FIG. 25 shows the detail of the folding mechanism for the long partition dividers 50. A wall of the organizer liner 400 has a first hinge means 401, arranged adjacent the bottom portion 15 of the liner, and a first holding means 402, for holding the divider in an upright position. The long partition divider 50 has a second hinge means 51, arranged to cooperate with the first hinge means 401 of the wall 400, and a second holding means 52, arranged to cooperate with the first holding means of the wall. When the second hinge means is inserted into the first hinge means, the long partition divider is allowed to move slightly in a vertical direction, to allow the second holding means to slide into locking position in the first holding means. To fold the divider down, the divider is lifted straight up, until the first and second holding means disengage, then the divider may be laid flat onto the bottom portion of the liner by rotating the divider down with the help of the first and second hinge means.

Figure 26:
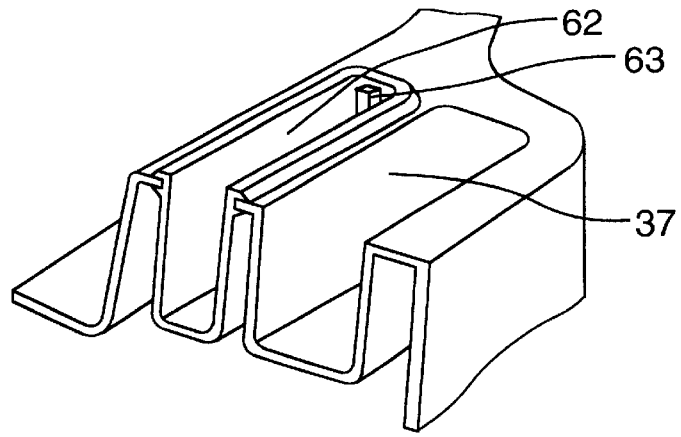
FIG. 26 is a detail elevational side view of the short partition divider storage and utility bin.

FIG. 26 schematically shows how storage compartments may be arranged in either the rigid elements or directly in the flexible material of the liner. A general storage compartment 37 may be directly formed integral with the material forming the rigid element or the flexible material of the liner. Alternatively, a snap-fit arrangement may be used, where the storage compartment, for example a short partition divider storage compartment 62, is separately formed and then pressed into a preformed hole in the liner. In FIG. 26 is also shown how the short partition divider storage compartment 62 preferably is provided with retention grooves 63, for positive retention of stored short partition dividers. The retention grooves also eliminate squeak and rattle noises.

Figure 27:
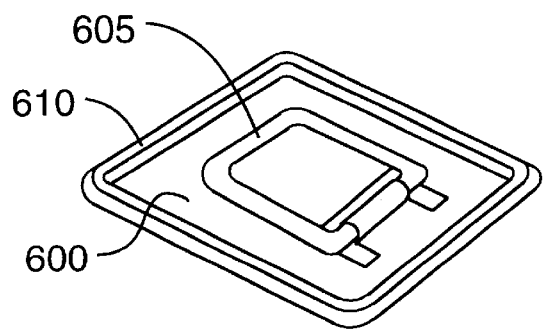
FIG. 27 is a detail elevational side view of an opening for a cargo net hook in the organizer liner according to the present invention.

FIG. 27 shows how a cargo net hook 605 opening 600 in the liner would be surrounded by a spill-protection lip 610 made of the same flexible material as the bottom portion of the liner.

Figure 31:
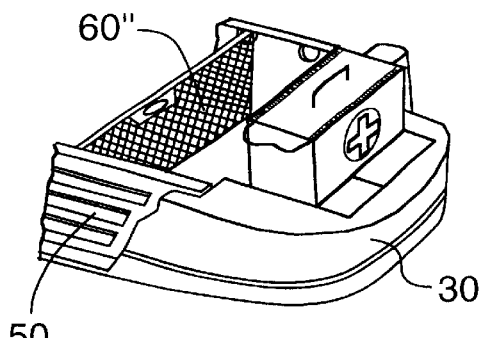
FIG. 31 is a further detail elevational side view of a removable utility bag or cooler in the organizer liner according to the present invention.
Figure 28:
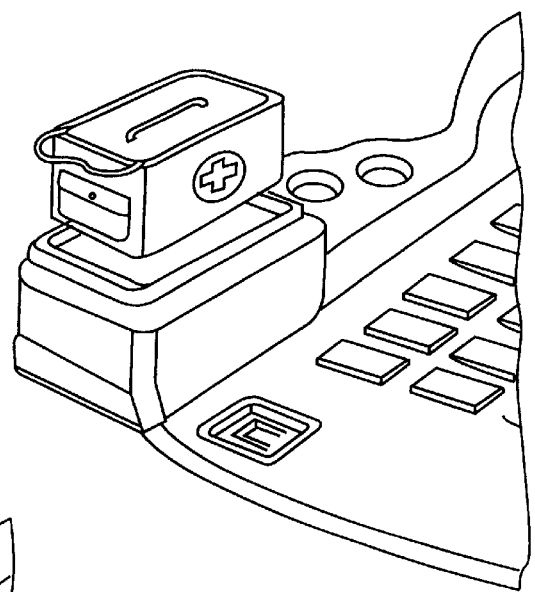
FIG. 28 is a detail elevational side view of a removable utility bag or cooler in the organizer liner according to the present invention.
Figure 34:
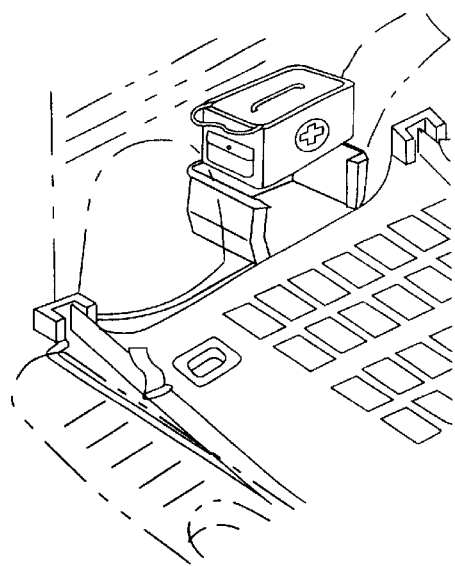
FIG. 34 is a still further detail elevational side view of a removable utility bag or cooler in the organizer liner according to the present invention.

FIGS. 28, 31 and 34 show a detail of a first-aid-kit holder, or utility bag/cooler holder, arranged in a rigid element of the liner.

Figure 33:
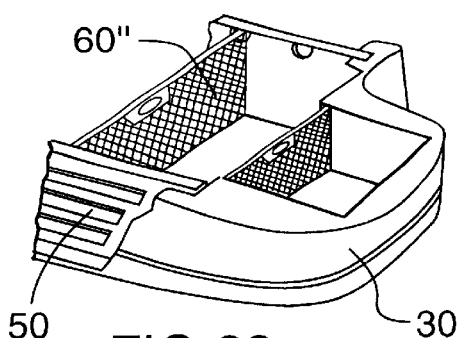
FIG. 33 is a further detail elevational side view of a removable and retractable short partition divider in the organizer liner according to the present invention.
Figure 29:
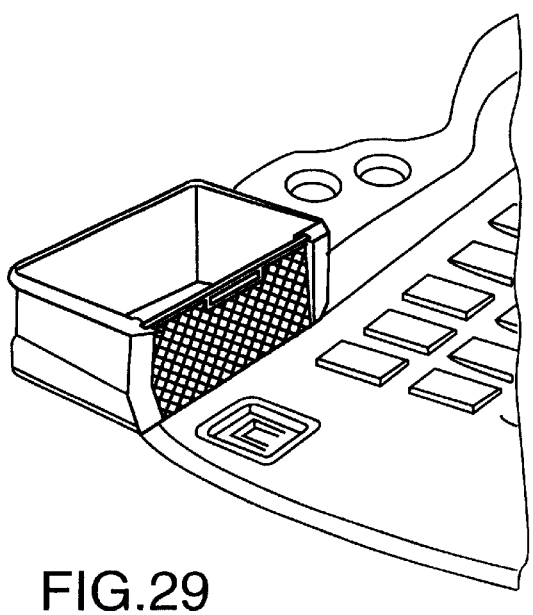
FIG. 29 is a detail elevational side view of a removable and retractable short partition divider in the organizer liner according to the present invention.
Figure 35:
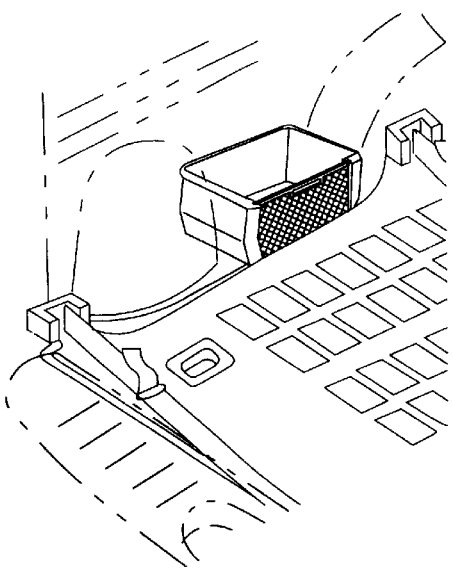
FIG. 35 is a still further detail elevational side view of a removable and retractable short partition divider in the organizer liner according to the present invention.

FIGS. 29, 33 and 35 show a detail of a removable net type short partition divider arranged in a rigid element of the liner.

Figure 32:
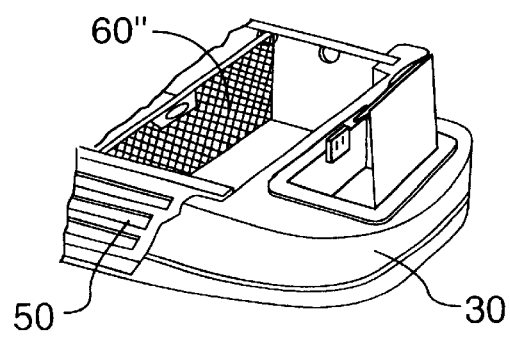
FIG. 32 is a further detail elevational side view of a lockable storage bin in the organizer liner according to the present invention.
Figure 30:
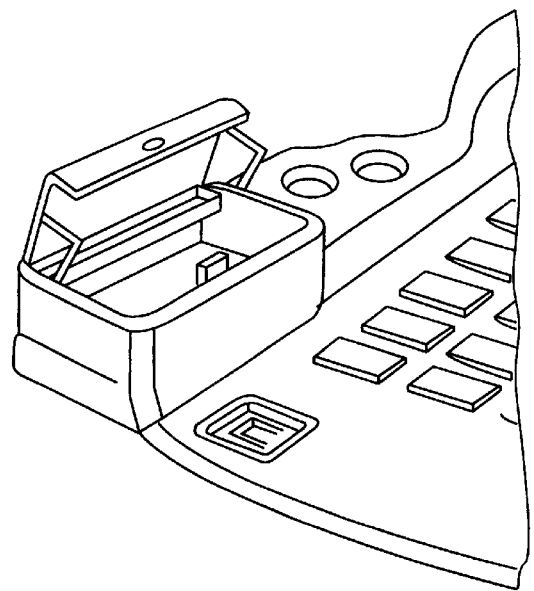
FIG. 30 is a detail elevational side view of a lockable storage bin in the organizer liner according to the present invention.
Figure 36:
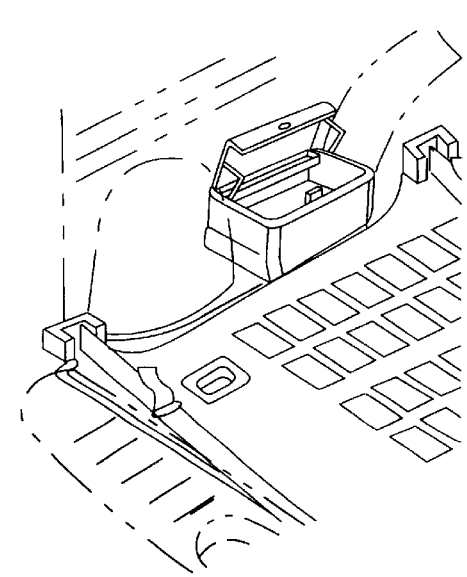
FIG. 36 is a still further detail elevational side view of a lockable storage bin in the organizer liner according to the present invention.

FIGS. 30, 32 and 36 show a detail of a lockable storage bin arranged in a rigid element of the liner.

Figure 37:
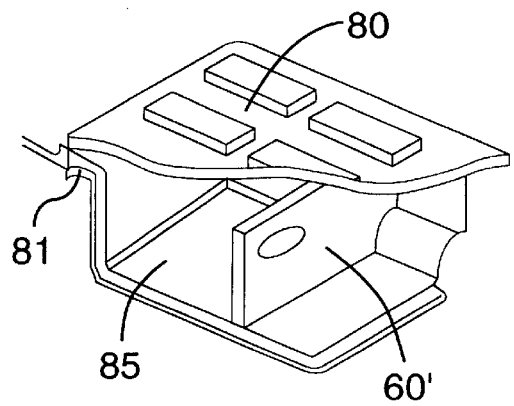
FIG. 37 is a detail elevational side view of a sub-floor storage compartment in the organizer liner according to the present invention.

FIG. 37 shows a detail of a spill-lip 81 arranged between the openable hatch 80, covering a sub-floor storage space 85, and the liner.

Thus, referring to all embodiments of the invention, the long partition divider 50 preferably has reinforcement means running longitudinally therealong for greater rigidity and strength, and each long divider and the liner is provided with means 72, 401, 402 for engaging the long divider to secure it to the liner. The reinforcement means comprises at least one rib running from a point adjacent one end of the long divider to a point adjacent the other end of the long divider, either continuously or as an interrupted line. For example, the reinforcement means may be three ribs, generally evenly spaced from top to bottom of the long divider. The liner further preferably has at least one removable short divider 60, 60', 60", each short divider being adapted to be positionable between a wall of the liner and one long divider. Each rib on the long divider 50, 70 is arranged on the side of the long divider opposite the at least one short divider, and each short divider and each long divider and the liner is provided with means for engaging the short divider to secure it to the long divider and the liner. For example, each short divider 60, 60', 60" may have a vertical slot at one end thereof defining a hook portion adapted to hook over the long divider 50, 70, the hook portion extending downwardly far enough to overlie at least one of the ribs, the long divider and rib being accommodated in the slot in a friction fit.

Each short divider 60, 60', 60" is typically approximately 5 mm in thickness, but other thicknesses may be used when called for.

The means 72, 402 for engaging the long divider 50, 70 to secure it to the liner preferably comprises vertical grooves formed in the wall of the liner, into which opposite ends of the long divider are fitted.

Each short divider 60, 60', 60" preferably has one end accommodated in a vertical groove passing through the rib.

Through utilizing flexible and friction enhanced polymer materials it is possible to form an overall product shape that is leak-proof and conforms to all vehicle interior contours such as wheel wells and floor perimeters. The liner material may scratch and mar, but will protect the cargo floor or carpet from snagging or tearing etc. An added benefit of the material's flexibility is the ability to flex inward through trunk or cargo hold openings during installation and then flex outward once inside the vehicle. Complete coverage of the trunk or cargo hold is then, advantageously, possible including the area above the wheel wells that can be used for storage. A rigid product would not offer the complete coverage feature. An important part of the invention, however, is the incorporation of rigid components within the overall flexible shape such that walls are stiffened where there is a need to add structure to the system or where integral features are designed. These features can include cup holders, soda and water/milk jug holders, various utility trays and bins as well as soda/ice insulated coolers. The flexible nature of the liner bottom also helps eliminate squeak and rattle noises in the vehicle, due to its sound-deadening qualities.

A further feature of the invention includes a subsystem of structurally shaped short and long partitions that interlock in various configurations to sort and secure commonly transported cargo. They are rigid in nature and are integrated with the flexible liner, with the unique ability of being stored out of the way when not in use. This is accomplished through long partitions or tailgate sections if desirable, folding downward into or onto the liner floor creating a flush and level cargo hold surface. Alternatively, the long partitions may be removed for storage either in the vehicle or outside the vehicle. Short partitions are removed and preferably stored securely in a holding bin incorporated in the liner wall.

The rear vehicle convenience system can be adapted to the trunk or cargo hold of virtually any vehicle by incorporating all or some of the features noted above.

It will be appreciated that the above description relates to the preferred embodiment by way of example only. Many variations on the invention will be obvious to those knowledgeable in the field, and such obvious variations are within the scope of the invention as described, whether or not expressly described.

What is claimed is:

1. A vehicle cargo organizer system, for a cargo compartment of a vehicle, the cargo compartment comprising a floor and at least two walls, the system comprising a liner, generally flexible in any direction, configured to cover and generally conform to the shape of at least a substantial portion of the cargo compartment floor, such that said liner may be folded readily in any direction to facilitate insertion into a confined space such as the cargo compartment, further comprising at least one storage element of substantially greater rigidity secured to said liner, thereby providing said system with substantially greater rigidity at least adjacent each said storage element, each said storage element providing generally rigid means for retaining cargo.

2. A system according to claim 1, wherein at least one said storage element spans a substantial portion of said liner, to thereby provide substantially greater rigidity to the overall system once installed.

3. A system according to claim 1, wherein at least one said storage element is arranged adjacent at least one edge of the liner to form at least a partial wall, at least a portion of each such wall generally conforming in shape to a wall of the cargo compartment.

4. A system according to claim 1, comprising at least two said storage elements substantially spaced apart from each other, and at least one generally rigid element extending between said at least two storage elements, each said generally rigid element thereby providing increased rigidity between said storage elements.

5. A system according to claim 4, comprising at least two said generally rigid elements which are dividers, providing at least one additional storage area between them.

6. A system according to claim 5, further comprising at least one removable subdividing means extending between said dividers to thereby create additional storage areas.

7. A system according to claim 4, wherein at least two said spaced apart storage elements are adjacent opposite edges of said liner.

8. A system according to claim 1, wherein said means for retaining cargo is selected from the group consisting of a cup holder, a tray, a bin, an insulated cooler, a beverage container holder, a storage compartment with a lid, a storage compartment without a lid, and a storage well.

* * * * *